United States Patent
Teng et al.

(10) Patent No.: US 11,368,573 B1
(45) Date of Patent: Jun. 21, 2022

(54) PASSIVELY DETERMINING A POSITION OF A USER EQUIPMENT (UE)

(71) Applicant: QUALCOMM Incorporated, San Diego, CA (US)

(72) Inventors: Diyan Teng, Santa Clara, CA (US); Mehul Soman, San Jose, CA (US); Nisarg Trivedi, Ann Arbor, MI (US); Rashmi Kulkarni, Redwood City, CA (US); Justin McGloin, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/317,416

(22) Filed: May 11, 2021

(51) Int. Cl.
*H04M 1/72454* (2021.01)
*G06F 3/01* (2006.01)
*G01C 21/16* (2006.01)

(52) U.S. Cl.
CPC ...... *H04M 1/72454* (2021.01); *G01C 21/165* (2013.01); *G06F 3/011* (2013.01)

(58) Field of Classification Search
CPC ... H04M 1/72454; G01C 21/165; G06F 3/011
USPC ................................................. 455/414.1
See application file for complete search history.

(56) References Cited

U.S. PATENT DOCUMENTS

| | | |
|---|---|---|
| 8,519,971 B1 | 8/2013 | Mackraz |
| 8,533,266 B2 | 9/2013 | Koulomzin et al. |
| 9,405,391 B1 | 8/2016 | Mackraz |
| 10,148,304 B2 | 12/2018 | Chang et al. |
| 2015/0169780 A1* | 6/2015 | Mishra ................ G06F 16/9562 707/736 |
| 2015/0241962 A1 | 8/2015 | Reznik et al. |
| 2016/0282934 A1 | 9/2016 | Willis et al. |
| 2022/0070619 A1* | 3/2022 | White ................... H04W 4/027 |

OTHER PUBLICATIONS

Goel M., et al., "GripSense: Using Built-In Sensors to Detect Hand Posture and Pressure on Commodity Mobile Phones", Proceedings of the 25th Annual ACM Symposium on User Interface Software and Technology (UIST'12), Oct. 7-10, 2012, pp. 545-554.

(Continued)

*Primary Examiner* — Thomas J Lett
(74) *Attorney, Agent, or Firm* — Qualcomm Incorporated

(57) ABSTRACT

In some aspects, a user equipment (UE) determines, using an inertial measurement unit, an orientation of the UE and determines, using ambient light sensors, an ambient light condition of the UE. The UE determines, using a machine learning module and based on the orientation and the ambient light condition, a position of the UE. If the position comprises an on-body position, the UE uses the machine learning module and touch data received by a touchscreen of the UE to determine whether the position comprises an in-hand position. If the position comprises the in-hand position, the UE determines, using the machine learning module and based on the orientation and the touch data, a grip mode. If the position comprises an off-body position, the UE determines, using the machine learning module and at least one of the inertial measurement unit or the ambient light sensors, a user presence or a user absence.

30 Claims, 10 Drawing Sheets

(56) References Cited

OTHER PUBLICATIONS

Le HV., et al., "InfiniTouch: Finger-Aware Interaction on Fully Touch Sensitive Smartphones", Proceedings of the 31st Annual ACM Symposium on User Interface Software and Technology (UIST'18), Oct. 14-17, 2018, 15 pages.

Nguyen V., et al., "HandSense: Capacitive Coupling-based Dynamic, Micro Finger Gesture Recognition", Proceedings of the 17th ACM Conference on Embedded Networked Sensor Systems (SenSys'19), Nov. 10-13, 2019, 13 pages.

* cited by examiner

PASSIVELY DETERMINING A POSITION OF A USER EQUIPMENT (UE)

BACKGROUND OF THE DISCLOSURE

1. Field of the Disclosure

Aspects of this disclosure relate generally to user equipment (UE), and more specifically to passively determining a position of the UE (e.g., relative to a user).

2. Description of the Related Art

A User Equipment (UE), such as a smartphone, a tablet, or another type of device can actively determine where a user is located. For example, the UE can use a camera sensor to capture one or more images and determine where the user is located. However, such active techniques raise privacy concerns and may, in some cases, violate local privacy laws.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In a first aspect, a method to passively determine a position of a user equipment includes determining, using an inertial measurement unit of the user equipment, an orientation of the user equipment and determining, using an ambient light sensor of the user equipment, an ambient light condition associated with the user equipment. The method includes determining, using a machine learning module of the user equipment and based on the orientation and the ambient light condition, a position of the user equipment. The method includes, based on determining that the position comprises an on-body position, determining using the machine learning module and based on touch data received by a touchscreen of the user equipment whether the position comprises an in-hand position. The method includes, based on determining that the position comprises the in-hand position, determining, using the machine learning module and based at least in part on the orientation and the touch data, a grip mode associated with the user equipment. The method includes, based on determining that the position comprises an off-body position, determining a user presence or a user absence, using the machine learning module and at least one of the inertial measurement unit or the ambient light sensor.

In a second aspect, a user equipment includes a memory, a communication interface, and at least one processor communicatively coupled to the memory and the communication interface. The at least one processor is configured to determine an orientation of the user equipment using an inertial measurement unit of the user equipment and determine an ambient light condition associated with the user equipment using an ambient light sensor of the user equipment. The at least one processor is configured to determine a position of the user equipment using a machine learning module of the user equipment and based on the orientation and the ambient light condition. Based on determining that the position comprises an on-body position, the at least one processor is configured to determine whether the position comprises an in-hand position, using the machine learning module and based on touch data received by a touchscreen of the user equipment. Based on determining that the position comprises the in-hand position, the at least one processor is configured to determine a grip mode associated with the user equipment, using the machine learning module and based at least in part on the orientation and the touch data. Based on determining that the position comprises an off-body position, the at least one processor is configured to determine a user presence or a user absence, using the machine learning module and at least one of the inertial measurement unit or the ambient light sensor.

In a third aspect, a user equipment includes means for determining an orientation of the user equipment and means for determining an ambient light condition associated with the user equipment. The user equipment includes means for determining a position of the user equipment, using a machine learning module of the user equipment and based on the orientation and the ambient light condition. The user equipment includes means for determining whether the position comprises an in-hand position using the machine learning module and based on touch data received by a touchscreen of the user equipment. The user equipment includes means for determining a grip mode associated with the user equipment, using the machine learning module and based at least in part on the orientation and the touch data. The user equipment includes means for determining a user presence or a user absence, using the machine learning module and at least one of the means for determining the orientation of the user equipment and the means for determining the ambient light condition associated with the user equipment.

In a fourth aspect, a non-transitory computer-readable medium stores computer-executable instructions that, when executed by a user equipment, cause the user equipment to determine, using an inertial measurement unit of the user equipment, an orientation of the user equipment and determine, using an ambient light sensor of the user equipment, an ambient light condition associated with the user equipment. The instructions are further executable to determine, using a machine learning module of the user equipment, based on the orientation and the ambient light condition, a position of the user equipment. The instructions are further executable to determine, using the machine learning module and based on touch data received by a touchscreen of the user equipment, whether the position comprises an in-hand position. The instructions are further executable to determine, using the machine learning module and based at least in part on the orientation and the touch data, a grip mode associated with the user equipment. The instructions are further executable to determine a user presence or a user absence, using the machine learning module and at least one of the inertial measurement unit or the ambient light sensor.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
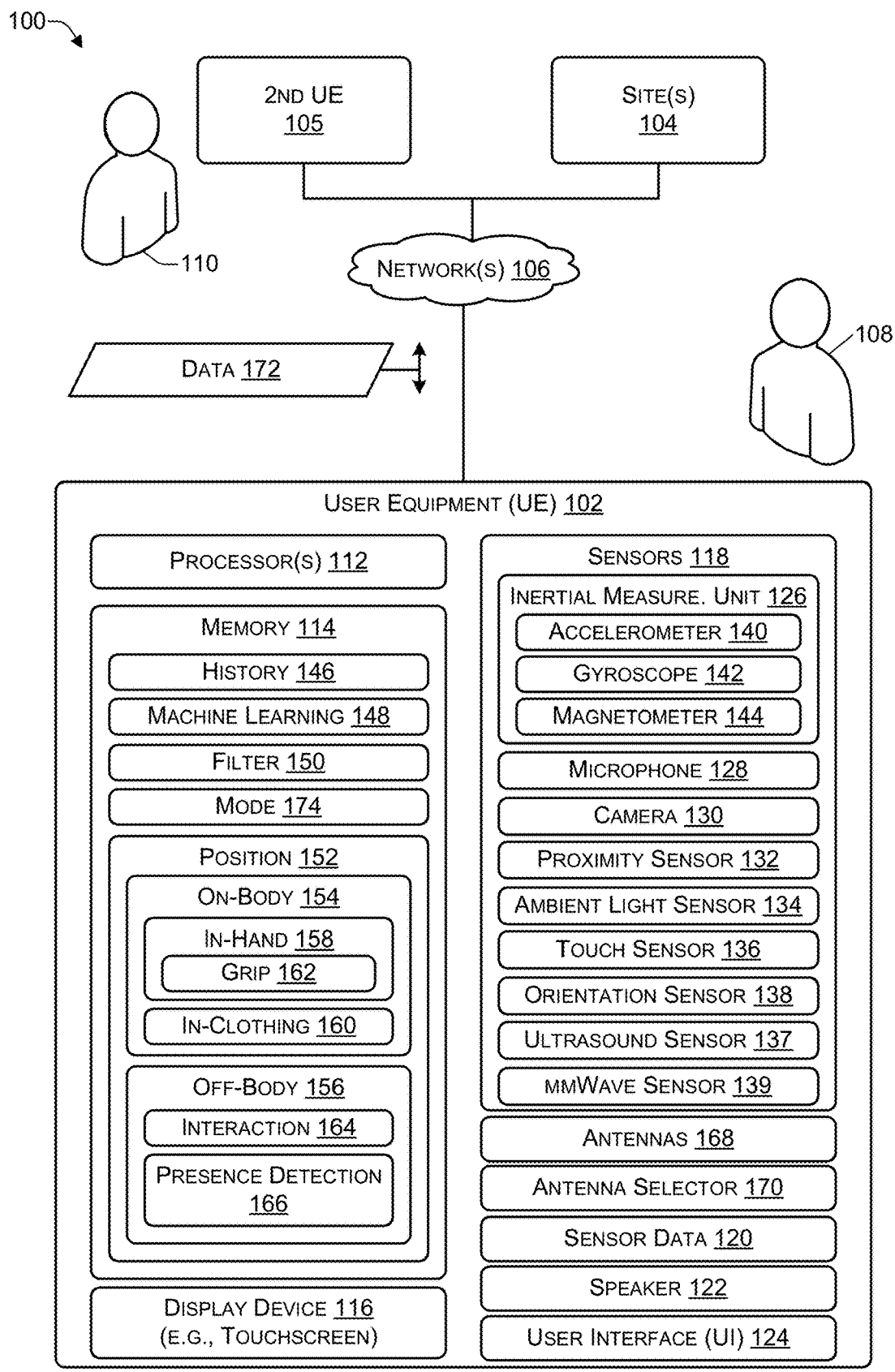
FIG. 1 illustrates an example of a system in which a user equipment (UE) determines a position, according to various aspects of the disclosure.

Disclosed are systems and techniques for passively determining, using machine learning and based on sensor data, a generalized device position (referred to herein as "position") of a user equipment (UE), such as, for example, a computing device (e.g., a smartphone, a tablet, or the like). The passive sensing used by the systems and techniques is designed to have little or no impact on a user experience (UX) of a user associated with the UE. In addition, sensor data from sensors included in the UE are used.

The systems and techniques include using sensor data to determine a position of the user equipment relative to a user. For example, the sensor data may be used to determine whether the user equipment is located in-hand (e.g., being held by the user), on-body (e.g., located in a pocket or the like of the user's clothing), or off-body (e.g., on a table, on a bed, or the like). If the position is in-hand, then the user equipment may determine which hand (e.g., left hand or right hand) is being used to hold the user equipment and which hand is being used to interact with a touchscreen of the user equipment. The systems and techniques may use machine learning to predict an activity that the user is performing, such as, for example, texting, scrolling/browsing, calling, or the like. If the position is off-body, then the systems and techniques determine whether a presence or an absence of the user near the user equipment. If the user is absent, the sensor data may be analyzed using machine learning to determine when the user is approaching the user equipment.

If the user equipment determines that a call is being initiated, the user equipment may determine that the position is an in-hand position and determine a grip associated with the in-hand position. The grip may include information associated with which hand is holding the user equipment and grip points where the user equipment is being held. Based on this information, the user equipment may select particular antennas from multiple available antennas of the user equipment for use in the call. For example, antennas near the grip points may not be selected (or power sent to them reduced) to reduce a specific absorption rate (SAR). Antennas that are located further away from the grip points may be selected to increase a transmission efficiency when placing the call by avoiding using antennas that are at least partially blocked by the grip points.

The user equipment may determine the position periodically, at a particular time interval (e.g., every N seconds, N>0). If the user equipment determines that a transition from an on-body position to an off-body position, without an intervening in-hand position, occurred, then the user equipment may determine that the user equipment fell out of a pocket (or other location) and automatically (e.g., without human interaction) generate an audible alert to alert the user that the user equipment is no longer on-body.

If a health alert mode is enabled, the user equipment may create a history file that includes a history of the positions and the time at which each position occurred. For example, initiated a call at 9:00 AM, browsed the Internet at 10:00 AM, and so on. If the position of the user equipment does not change for at least a particular amount of time (e.g., M or more minutes, M>0, such as M>=60), then the user equipment may automatically initiate a call to a recipient designated in contacts of the user equipment or if no recipient is designated, to emergency services, such as 911. For example, the user equipment may automatically initiate a call to a family member, a friend, a neighbor, or emergency services if the user equipment has not changed position in the particular amount of time, indicating that a user with medical issues may have fallen or become incapacitated.

The user equipment may provide the grip points to a user interface to enable the user interface to avoid placing pop-up notifications in locations on the display device where the grip points may make the pop-up notifications difficult for the user to view. In some cases, the user interface may adjust the location and a font size of the pop-up notification to enable the pop-up notification to fit into a particular location on the display device that is viewable by the user, taking into account the grip points.

The user equipment may use sensor data to determine user presence or user absence. For example, if the user equipment is off-body, then the user equipment may use one or more sensors to determine whether the user is nearby. If the user equipment has been placed on a hard surface (e.g., a table), then the user equipment may gather sensor data from an accelerometer, a microphone or the like, filter the sensor data to create filtered data, and use machine learning to determine whether the filtered data indicates sound waves generated by user. For example, the user walking near the user equipment may create vibrations that are captured by the accelerometer, the microphone, or both. The filter may be used to filter out ambient noise, leaving the vibrations caused by the user in the filtered data. If the user equipment has been placed on a soft surface (e.g., a bed, a sofa, or the like), then the user equipment may analyze (e.g., using machine learning) ambient light data received from one or more ambient light sensors of the user equipment to determine user presence or user absence. For example, if the user is walking near the user equipment, then the user equipment may detect changes in the ambient light (e.g., caused by the user's body creating a shadow). The machine learning may predict the user presence based on the changes in the ambient light.

In some cases, the user equipment may communicate with nearby devices, e.g., using Wi-Fi, Bluetooth, or another near field communication technology, to determine or share user presence or user absence information. For example, the user may be working out, near the user equipment, using exercise equipment that is Wi-Fi enabled, Bluetooth enabled, or the like. The user equipment may communicate with the exercise equipment to determine the user presence. In addition, the user equipment may communicate user presence or user absence to suitably enabled devices within a proximity of the user equipment. For example, if the user equipment transitions from on-body, to in-hand, to off-body, then the user equipment may alert suitably enabled devices within a proximity of the user equipment of the user presence. In response, one or more of the suitably enabled devices may transition to a powered-on mode. For example, if the user places the user equipment on a surface and walks towards the exercise equipment, the user equipment may notify the exercise equipment of the user presence and the exercise equipment may automatically power on and automatically select a preferred workout associated with the user.

If the user equipment determines the user absence, then the user equipment may disable displaying notifications on a display device to conserve battery power. Subsequently, if the user equipment determines the user presence, then the user equipment may resume displaying notifications on the display device. In addition, the user equipment may display on the display device notifications that were received but not displayed during the user absence.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "example" are used herein to mean "serving as an example, instance, or illustration." Any aspect described herein as "example" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send RF signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "positioning signal," a "radio wave," a "waveform," or the like, or simply a "signal" where it is clear from the context that the term "signal" refers to a wireless signal or an RF signal.

FIG. 1 illustrates an example of a system 100 in which a user equipment (UE) determines a position, according to various aspects of the disclosure. The system 100 includes a user equipment 102 connected to one or more sites 104, a second user equipment 105, via one or more networks 106. The user 108 may be associated with the user equipment 102 and a second user 110 may be associated with the second user equipment 105.

The user equipment 102 includes one or more processors 112, a memory 114, a display device 116, and sensors 118. The display device 116 is a touchscreen device capable of receiving touch input and transmitting touch data. The sensors 118 may generate sensor data 120. The user equipment 102 may include a speaker 122 (e.g., a transducer) to output an audio signal. One or more software applications executing on the user equipment 102 may display a user interface 124 on the display device 116.

The sensors 118 may include an inertial measurement unit 126, a microphone 128, a camera 130 (e.g., a lens and an imaging sensor), a proximity sensor 132, at least one ambient light sensor (ALS) 134, a touch sensor 136 (e.g., that may be associated with the display device 116), an ultrasound sensor 137, an orientation sensor 138, and a mmWave sensor 139. The inertial measurement unit 126 may include one or more of an accelerometer 140, a gyroscope 142 and a magnetometer 144. The accelerometer 140 measures proper acceleration, e.g., the acceleration (the rate of change of velocity) of a body in its own instantaneous rest frame. The accelerometer 140 may be a single axis or a multi-axis accelerometer (e.g., a triaxial accelerometer). The gyroscope 142 may measure angular velocity. The magnetometer 144 measures the direction, strength, or relative change of a magnetic field at a particular location. The microphone 128 converts sound waves into audio data. The camera 130 may include a lens and an imaging sensor and may be used to capture image data or video data (e.g., multiple images captured at a particular frame rate, such as, 30 frames per second (fps)). The proximity sensor 132 may be able to detect the presence of nearby objects without physical contact by emitting an electromagnetic radiation (e.g., infrared) and identifying changes in the return (e.g., reflected) signal. The proximity sensor 132 may include a capacitive proximity sensor, a photoelectric sensor, an inductive proximity sensor or the like. The ALS 134 photodetector is used to determine an amount of ambient light present. The orientation sensor 138A may be based on micro-electro-mechanical systems (MEMS) technology and may use a triaxial gyroscope (e.g., the gyroscope 142), a triaxial accelerometer (e.g., the accelerometer 140), triaxial electronic compass (e.g., the magnetometer 144), or other sensor to determine a three-dimensional orientation of the user equipment 102. The ultrasound sensor 137 may include an ultrasonic transducer to measure a distance to a target object by emitting ultrasonic sound waves and converting the reflected sound into an electrical signal. The mmWave sensor 139 detects objects and provides a range, a velocity, and an angle of each of the objects. mmWave sensor 139 uses a contact-less-technology that operates in the spectrum between 30 to 300 GigaHertz (GHz). By using small wavelengths, the mmWave sensor 139 can provide sub-mm range accuracy and can penetrate materials such as plastic, drywall, clothing, and the like.

The memory 114 may store a history 146, the machine learning 148, a filter 150, and a position 152 associated with the user equipment 102. The history 146 may include a history of the position of the user equipment 102 at a particular point in time. For example, the history 146 may include a position associated with the user equipment 102 and a timestamp identifying when the position was determined. The machine learning 148 may include multiple machine learning algorithms, with each machine learning algorithm used for a particular purpose, as described herein.

The position 152 may include on-body 154 and off-body 156. The on-body 154 may include in-hand 158 and in-clothing 160. The in-hand 158 may include a grip 162. The off-body 156 may include interaction 164 and presence detection 166. For example, the position 152 of the user equipment 102 may be either on-body 154 or off-body 156. If the position 152 is on-body 154, then the user equipment 102 may determine whether the position 152 is in-hand 158 or in-clothing 160. The machine learning 148 may use Adaptive Boosting (Ada Boost) machine learning to determine the on-body 154, the in-hand 158, and the in-clothing 160. Adaptive Boosting may be used with other types of learning algorithms to improve performance. The output of multiple other learning algorithms is combined to create a weighted sum (e.g., the output of the boosted classifier). If the position 152 is in-hand 158, then the user equipment 102 may determine the grip 162 using a 3-layer perceptron machine learning algorithm. The 3-layer perceptron is a type of artificial neural network (ANN) that uses at least three layers of nodes: an input layer, a hidden layer and an output layer. Other than the input nodes, each node is a neuron that uses a nonlinear activation function. 3-layer perceptron uses a supervised learning technique called backpropagation for training. The grip 162 may be one of the grips described in Table 1.

TABLE 1

Grips

| Grip | Gripped by | Input Provided By | Comment |
|---|---|---|---|
| 1 | Left + Right hand | Both thumbs | Typing |
| 2 | Right hand | Left thumb | Scrolling/Selecting |
| 3 | Left hand | Right thumb | Scrolling/Selecting |
| 4 | Right hand | Left hand (forefinger + thumb) | Pinch or expand |
| 5 | Left hand | Right hand (forefinger + thumb) | Pinch or expand |
| 6 | Left hand | Left thumb | Scrolling/Selecting |
| 7 | Right hand | Right thumb | Scrolling/Selecting |
| 8 | Right hand | Voice | Phone call |
| 9 | Left hand | Voice | Phone call |
| 10 | Left hand | Right forefinger | Selecting or typing |
| 11 | Right hand | Camera | |
| 12 | Left + Right hand | Left + Right thumbs | Gaming |
| 13 | Left or Right hand | Camera + either thumb | Photo/Video usage |
| 14 | Left or Right hand | Voice | Speakerphone |

The off-body 156 may include using interaction 164 and presence detection 166 to determine user presence or user absence. For example, if the user 108 has placed the user equipment 102 on a table for a video call or an audio call (or is using audio commands to a voice-enabled assistant to browse), the position 152 may be the off-body 156. The interaction 164 may determine that the user 108 is interacting with the user equipment 102 by using one or more of the microphone 128, the speaker 122, the camera 130, and the display device 116. The presence detection 166 may use vibrations picked up by the accelerometer 140, the microphone 128, or both that are filtered using the filter 150 to determine the user presence based on the vibrations created by the user 108. The presence detection 166 may use the ambient light sensor 134 to determine changes in the ambient light conditions due to the proximity of the user 108. For example, if the user equipment 102 has been placed on a bed or a sofa, the accelerometer 140, the microphone 128, or both may not capture vibrations due to the vibrational dampening effect of the bed or the sofa. In such situations, the user equipment 102 may use the ambient light sensor 134 to determine the user presence or user absence based on the user casting a shadow to modify the ambient light falling on the user equipment 102.

The user equipment 102 may exchange data 172 with the sites 104. For example, the user 108 may use the user equipment 102 to open an Internet browser and navigate to one or more of the sites 104. As another example, the user 108 may use the user equipment 102 to initiate a call (e.g., a video call or an audio call) with another user equipment, such as the second user equipment 105 associated with the second user 110. As yet another example, the user equipment 102 may communicate with the second user equipment 105 to determine or to communicate the user presence or the user absence. For example, the second user equipment 105 may be an Internet of things (IOT) device, such as an exercise machine, a voice-enabled assistant, or the like. In some cases, the user equipment 102 may communicate with the second user equipment 105 to communicate or determine the user presence or the user absence. For example, if the user equipment 102 determines that the position 152 has transitioned from on-body 154 to off-body 156, the user equipment 102 may instruct the second user equipment 105 to power on because the user 108 may be getting ready to use the exercise machine. As another example, if the user 108 is using the second user equipment 105, such as an exercise machine, the second user equipment 105 may communicate the presence of the user 108 to the user equipment 102.

Thus, the user equipment 102 may passively determine, using the machine learning 148 and based on the sensor data 120, the position 152 of the user equipment 102 (e.g., a smartphone, a tablet, or the like). The passive sensing is designed to be non-invasive and have little or no impact on a user experience (UX) of the user 108.

The user equipment 102 uses the sensor data 120 to determine the position 152 of the user equipment 102 (e.g., relative to the user 108). For example, the sensor data 120 may be used to determine whether the user equipment 102 is located in-hand 158 (e.g., being held by the user), on-body 154 (e.g., located in a pocket or the like of the user's clothing), or off-body 156 (e.g., on a table, on a bed, or the like). If the position is in-hand 158, then the user equipment 102 may determine which hand (e.g., left hand or right hand) is being used to hold the user equipment 102 and which hand is being used to interact with the touchscreen of the display device 116. The machine learning 148 is used to predict an activity that the user 108 is performing, such as, for example, texting, scrolling/browsing, calling, or the like. If the position 152 is off-body 156, then the user equipment 102 determines a user presence or user absence of the user 108 near the user equipment 102. If the user 108 is absent, the sensor data 120 may be analyzed using machine learning 148 to determine when the user 108 is approaching the user equipment 102.

The user equipment 102 may determine the position 152 periodically, at a particular time interval (e.g., every N seconds, N>0). If the user equipment 102 determines a transition from on-body 154 to off-body 156, without an intervening in-hand 158, then the user equipment 102 may determine that the user equipment 102 fell out of an article of clothing of the user 108 and automatically (e.g., without human interaction) generate an audible alert through the speaker 122 to alert the user 108.

If a health alert mode 174 of the user equipment 102 is enabled, the user equipment 102 may create the history 146 that includes a history of the positions (e.g., the position 152) and a time at which each position was determined. For example, the history 146 may include entries such as "initiated a call at 9:00 AM", "browsed the Internet at 10:00 AM", and so on. If the position 152 of the user equipment 102 does not change for at least a particular amount of time (e.g., M or more minutes, M>0, such as M>=60), then the user equipment 102 may automatically initiate a call to the second user equipment 105 (e.g., associated with the second user 110) if an emergency contact is designated in a contact book of the user equipment 102. If no emergency contact is designated in the user equipment 102, the then user equipment 102 may automatically initiate a call to emergency services, such as 911 in North America. Thus, the user equipment 102 may automatically initiate a call to emergency contact or to emergency services if the user equipment 102 determines that the position 152 has not changed for a particular amount of time, indicating that a user with medical issues may have fallen or become incapacitated. In some cases, the machine learning 148 may use the history 146 of past positions at particular times to determine a predicted current position at a current time and compare that with the position 152. For example, the history 146 may indicate that the user 108 places a call to the second user equipment 105 (e.g., to speak to a friend or a relative) at approximately a same time every Monday. Thus, the machine learning 148 may predict that the call to the second user equipment 105 will be placed at a particular time on Monday. If the machine learning 148 determines that the call to the second user equipment 105 has not been placed and the current position has not changed for at least a particular amount of time, then the user equipment 102 may automatically place a call to a designated emergency contact or emergency service (e.g., 911).

If the user equipment 102 determines that a call (e.g., voice call or video call) is being initiated, the user equipment 102 may determine that the position 152 is in-hand 158 and determine the grip 162. The grip 162 may include information associated with which hand is holding the user equipment 102 and grip points where the user equipment 102 is being held. Based on the grip 162, the user equipment 102 may use antenna selector 170 to select particular antennas from multiple available antennas 168 for the call. For example, those of the antennas 168 near the grip points may not be selected to reduce a specific absorption rate (SAR). Those of the antennas 168 that are located further away from the grip points may be selected to increase a transmission efficiency when placing the call to avoid using antennas that are at least partially blocked by the grip points.

The user equipment 102 may provide the grip points to the user interface 124 to enable the user interface 124 to avoid placing pop-up notifications in locations on the display device 116 where the grip points may make the pop-up notifications difficult for the user to view. In some cases, the user interface 124 may adjust the location and a font size of the pop-up notification to enable the pop-up notification to fit into a particular location on the display device 116 that is viewable by the user 108, taking into account the grip points.

The user equipment 102 may use sensor data 120 to determine user presence or user absence. For example, if the user equipment 102 is off-body 156, then the user equipment 102 may use one or more of the sensors 118 to determine whether the user 108 is nearby. If the user equipment 102 has been placed on a hard surface (e.g., a table), then the user equipment 102 may gather sensor data 120 from the accelerometer 140, the microphone 128 or the like, filter the sensor data 120 (e.g., to create filtered data), and use machine learning 148 to determine whether the filtered sensor data indicates the presence of the user 108. For example, when the user 108 is walking near the user equipment 102, the user 108 may create vibrations that are captured by the accelerometer 140, the microphone 128, or both. The filter 150 may be used to filter out ambient noise, leaving the vibrations caused by the user 108 in the filtered data. If the user equipment 102 has been placed on a soft surface (e.g., a bed, a sofa, or the like), then the user equipment 102 may analyze (e.g., using machine learning) ambient light data (e.g., the sensor data 120) received from the ambient light sensor 134 to determine user presence or user absence. For example, if the user 108 is walking near the user equipment 102, then the user equipment 102 may detect changes in the ambient light (e.g., caused by the user's body creating a shadow). The machine learning 148 may predict the user presence based on the changes in the ambient light data provided by the ambient light sensor 134.

In some cases, the user equipment 102 may communicate with nearby devices (e.g., the second user equipment 105), e.g., using Wi-Fi, Bluetooth, or another near field communication technology, to determine or share user presence or user absence information. For example, the user 108 may be working out using an exercise machine that is Wi-Fi enabled, Bluetooth enabled, or the like. The user equipment 102 may communicate with the exercise machine to determine the presence of the user 108. The user equipment 102 may communicate user presence or user absence to suitably enabled devices (e.g., IOT devices) that are proximal to the user equipment 102. For example, if the user equipment 102 transitions from on-body 154, to in-hand 158, to off-body 156, then the user equipment 102 may alert suitably enabled devices (e.g., the second user equipment 105) within a particular proximity of the user equipment 102 of the user presence. In response, one or more of the suitably enabled devices (e.g., the second user equipment 105) may transition to a powered-on mode. For example, if the user 108 places the user equipment 102 on a surface and walks towards the exercise machine, the user equipment 102 may notify the exercise machine of the user presence and the exercise machine may automatically power on and automatically select a preferred workout program associated with the user 108.

If the user equipment 102 determines the user absence, then the user equipment 102 may disable displaying notifications on the display device 116 to conserve battery power. Subsequently, if the user equipment 102 determines the user presence, then the user equipment 102 may resume displaying notifications on the display device 116. In addition, the user equipment 102 may display on the display device 116, those notifications that were received but not displayed during the user absence.

Figure 2A:
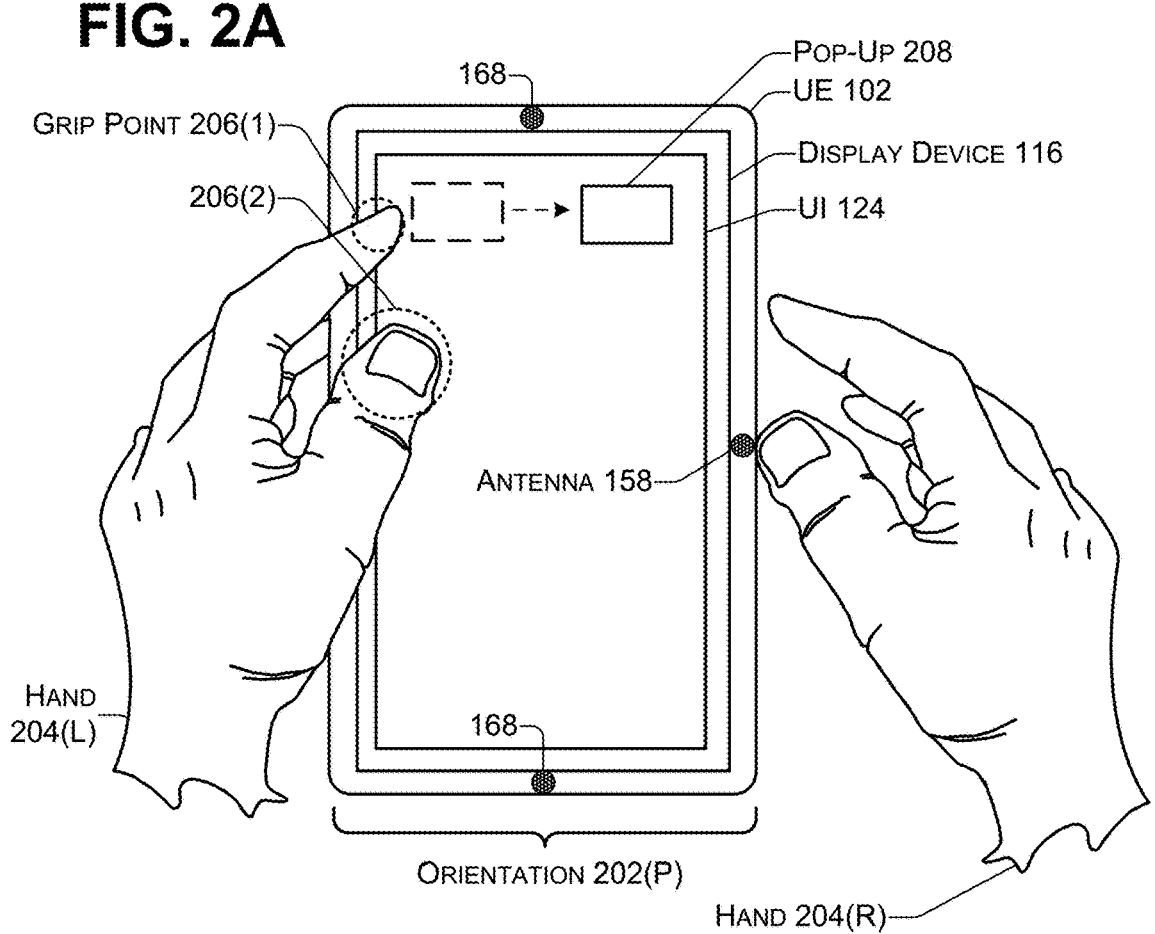
FIG. 2A illustrates a portrait orientation, according to various aspects of the disclosure.

FIG. 2A illustrates a portrait orientation, according to various aspects of the disclosure. In FIG. 2A, the user equipment 102 is in an orientation 202(P), where P indicates a portrait orientation. In FIG. 2A, a hand 204(L) (e.g., left hand) is gripping the user equipment 102 while a hand 204(R) (e.g., right hand) is providing touch input. The user equipment 102 may determine grip points 206(1), 206(2) where the hands 204 make contact with the touchscreen of the display device 116. Multiple antennas 168 may be located in different locations inside an enclosure of the user equipment 102, as illustrated in FIG. 2A.

If the user equipment 102 determines that a call (e.g., voice call or video call) is being initiated, the user equipment 102 determines whether the position 152 is in-hand 158 and, if in-hand 158, determines the grip 162. The grip 162 includes information associated with which hand is holding the user equipment 102 and grip points 206 where the user equipment 102 is being held. Based on the grip points 206, the user equipment 102 may select particular antennas from the multiple available antennas 168 for the call. For example, those of the antennas 168 near the grip points 206 may not be selected to reduce a specific absorption rate (SAR). Those of the antennas 168 that are located further away from the grip points 206 may be selected to increase a transmission efficiency when placing the call to avoid using antennas that are at least partially blocked by the grip points 206.

The user interface 124 may use the data identifying the grip points 206 to move pop-up notifications, such as a pop-up 208, to a different location on the display device 116 to reduce the possibility of the grip points 206 obscuring the pop-up 208. For example, the user interface 124 may move the pop-up 208 away from the grip point 206, as illustrated in FIG. 2A. The user equipment 102 may determine grip points 206 where the hands 204 may contact with the touchscreen of the display device 116. The user interface 124 may use the data identifying the grip points 206 to move pop-up notifications, such as a pop-up 208, to a different location on the display device 116 to reduce the possibility of the grip points 206 obscuring the pop-up 208. For example, the user interface 124 may move the pop-up 208 away from the grip point 206, as illustrated in FIG. 2A.

Figure 2B:
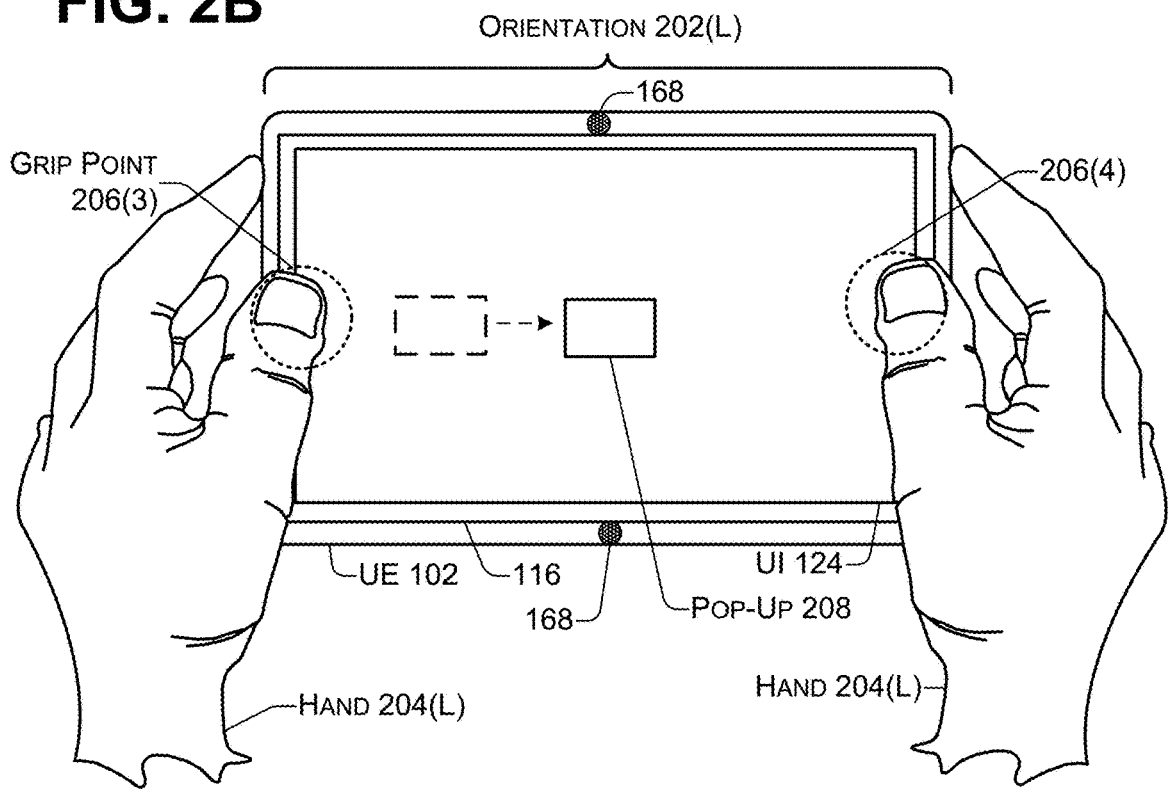
FIG. 2B illustrates a landscape orientation, according to various aspects of the disclosure.

FIG. 2B illustrates a landscape orientation, according to various aspects of the disclosure. In FIG. 2B, the user equipment 102 may have an orientation 202(L) (e.g., landscape orientation). For example, the user equipment 102 may be used to play a game, with the thumbs of each of the hands 204 being used to control various gaming parameters. As another example, the user equipment 102 may be used to take a photograph or a video. The user equipment 102 may determine grip points 206(3), 206(4) where the hands 204 make contact with the touchscreen of the display device 116.

If the user equipment 102 determines that a call is being initiated and the position 152 is in-hand 158, the user equipment 102 determines the grip 162, including the grip points 206 where the user equipment 102 is being held. Based on the grip points 206, the user equipment 102 selects particular antennas from the multiple available antennas 168 for the call. For example, those of the antennas 168 near the grip points 206 may not be selected to reduce a specific absorption rate (SAR). Those of the antennas 168 that are located further away from the grip points 206 may be selected to increase a transmission efficiency when placing the call to avoid using antennas that are at least partially blocked by the grip points 206.

The user interface 124 may use the data identifying the grip points 206 to move pop-up notifications, such as the pop-up 208, to a different location on the display device 116 to reduce the possibility of the grip points 206 obscuring the pop-up 208. For example, the user interface 124 may move the pop-up 208 to a location in-between the grip points 206(3), 206(4), as illustrated in FIG. 2B.

Figure 3:
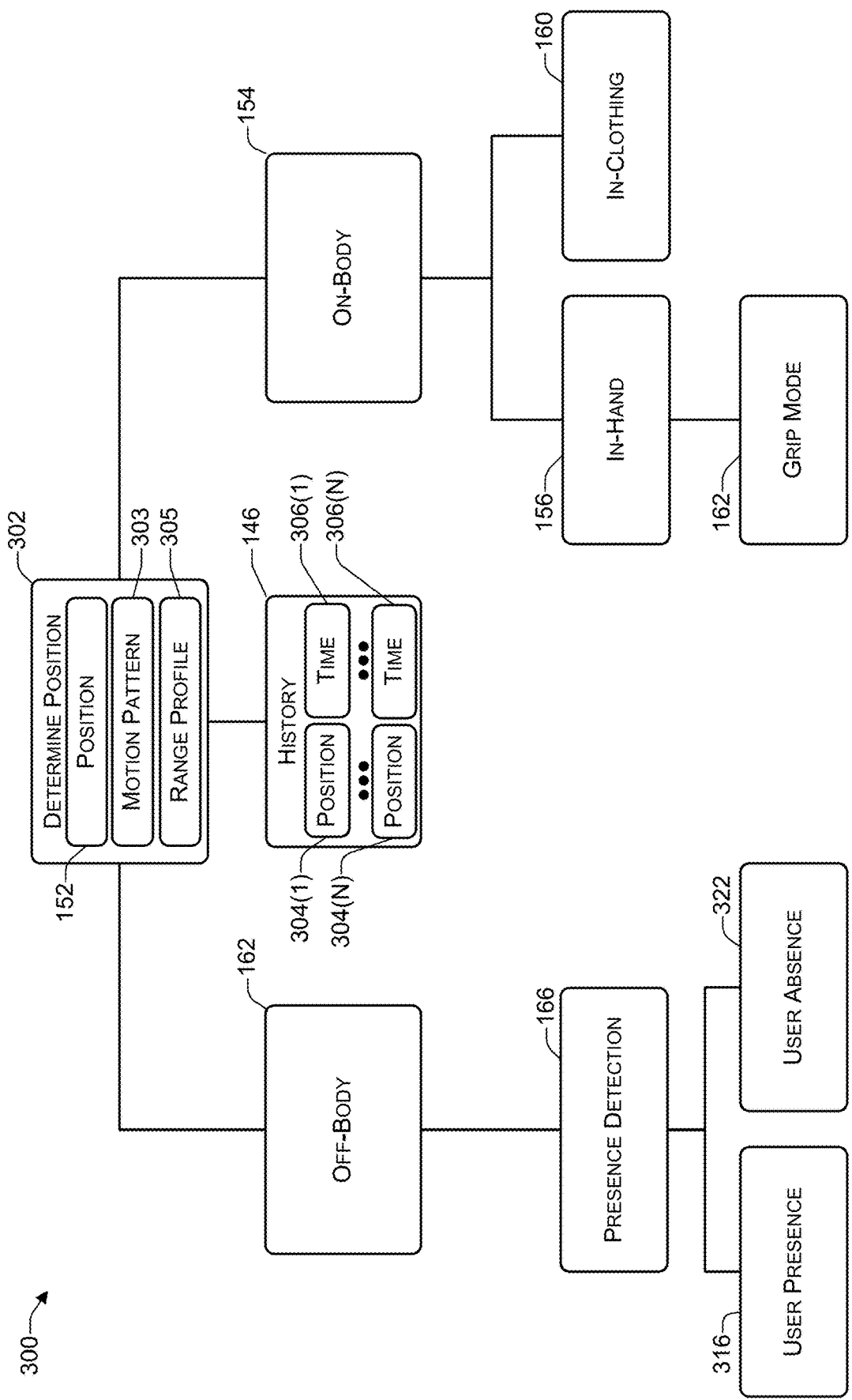
FIG. 3 illustrates an example decision tree to determine a position of a user equipment (UE), according to aspects of the disclosure.

FIG. 3 illustrates an example decision tree 300 to determine a position of a user equipment (UE), according to aspects of the disclosure. The decision tree 300 may be used by one or more components of the user equipment 102 of FIG. 1 and FIG. 2.

At 302, the user equipment 102 may passively determine a position of the user equipment 102 of FIG. 1, e.g., relative to the user 108, a motion pattern 303, and a range profile 305 associated with nearby objects. For example, in FIG. 1, the user equipment 102 may determine the position 152, the motion pattern 303, and the range profile 305 based on the sensor data 120 from the sensors 118.

Based on determining that the position 152 is the on-body 154, the user equipment 102 may determine, based on touch data received by the touch sensor 136, whether the position 152 comprises the in-hand 158. Based on determining that the position 152 is the in-hand 158, the user equipment 102 may determine, based at least in part on the touch data (from the touch sensor 136), the grip 162.

Based on determining that the position 152 comprises the off-body 156, the user equipment 102 may perform the presence detection 166 to determine a user presence 316 or a user absence 322, using the machine learning 148 and at least one of the inertial measurement unit 126 or the ambient light sensor 134. As a first example, determining the user presence 316 or the user absence 322 may include receiving vibration data (e.g., in the sensor data 120) from the inertial measurement unit 126, using the filter 150 to filter the vibration data to create filtered vibration data, and using the machine learning 148 to determine whether the filtered vibration data indicates user movement. For example, if the machine learning 148 determines that the filtered vibration data indicates user movement, then the user equipment determines the user presence 316. If the machine learning 148 determines that the filtered vibration data indicates lack of user movement, then the machine learning 148 determines the user absence 322. As a second example, the user equipment may receive ambient light data (e.g., included in the sensor data 120) from the ambient light sensor 134. If the machine learning 148 determines that the ambient light data indicates user movement, then the machine learning 148 determines the user presence 316. If the machine learning 148 determines that the ambient light data indicates lack of user movement, then the machine learning 148 determines the user absence 322.

After determining that the position 152 comprises the in-hand 158, the user equipment 102 may disable one or more transmission antennas of the antennas 168 that are proximal to grip points (e.g., the grip points 206 of FIG. 2A, 2B) associated with the grip 162 (see also Table 1).

After determining that the position 152 comprises the off-body 156, the user equipment 102 communicates the user presence 316 or the user absence 322 with other devices, such as other devices that are incapable of determining the user presence 316 and the user absence 322.

After determining that the position 152 comprises the off-body 156 and after determining the user absence 322, the user equipment 102 may disable displaying notifications on the display device 116 (e.g., to conserve battery power). Based on determining that the position 152 comprises the off-body 156 and based on determining the user presence 316, the user equipment 102 may enable notifications to be displayed on the display device 116.

After determining that the position comprises the on-body position and after determining the grip 162, the user equipment 102 may arrange graphical components (e.g., pop- 208 of FIG. 2A, 2B) of the user interface (UI) 124 based on the grip points 206.

After determining the off-body 156 and determining the user presence 316, the user equipment 102 may enable the user 108 to control other UEs (e.g., exercise machine, smart television, voice-assistant enabled device, or the like) using the user equipment 102.

In some cases, after determining the off-body 156 and after determining the user presence 316, the user equipment 102 may select the camera 130 and enable a user authentication process that is based on facial recognition. In other cases, after determining that the position comprises the off-body 156 and after determining the user presence 316, the user equipment 102 may select the microphone 128 and initiate a user authentication process that is based on voice recognition.

If the user equipment 102 determines an unusual transition, such as from the on-body 154 to the off-body 156 without determining an intervening in-hand 158, the user equipment 102 may generate an audible alert using the speaker 122.

If the user equipment 102 determines that the health alert mode 174 is enabled, the user equipment 102 may determine a current position 304(1) and an associated time 306(1) associated with the current position 304(1) and store the current position 304(1) and the associated time 306(1) in the history 146. The position 304 and associated time 306 may be determined every X seconds (X>0, e.g., X=60). The history 146 may include N entries (N>0). If a length of time between the time associated with the current position and a time associated with a previous position satisfies a time threshold, indicating that the user 108 has not changed position relative to the user equipment 102 for at least a threshold amount of time, the user equipment 102 may automatically generate a notification to a designated emergency contact or to emergency services.

In the flow diagrams of FIGS. 4, 5, 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, 600, and 700 are described with reference to FIGS. 1, 2A, 2B, and 3 as described above, although other models, frameworks, systems and environments may be used to implement these processes.

Figure 4:
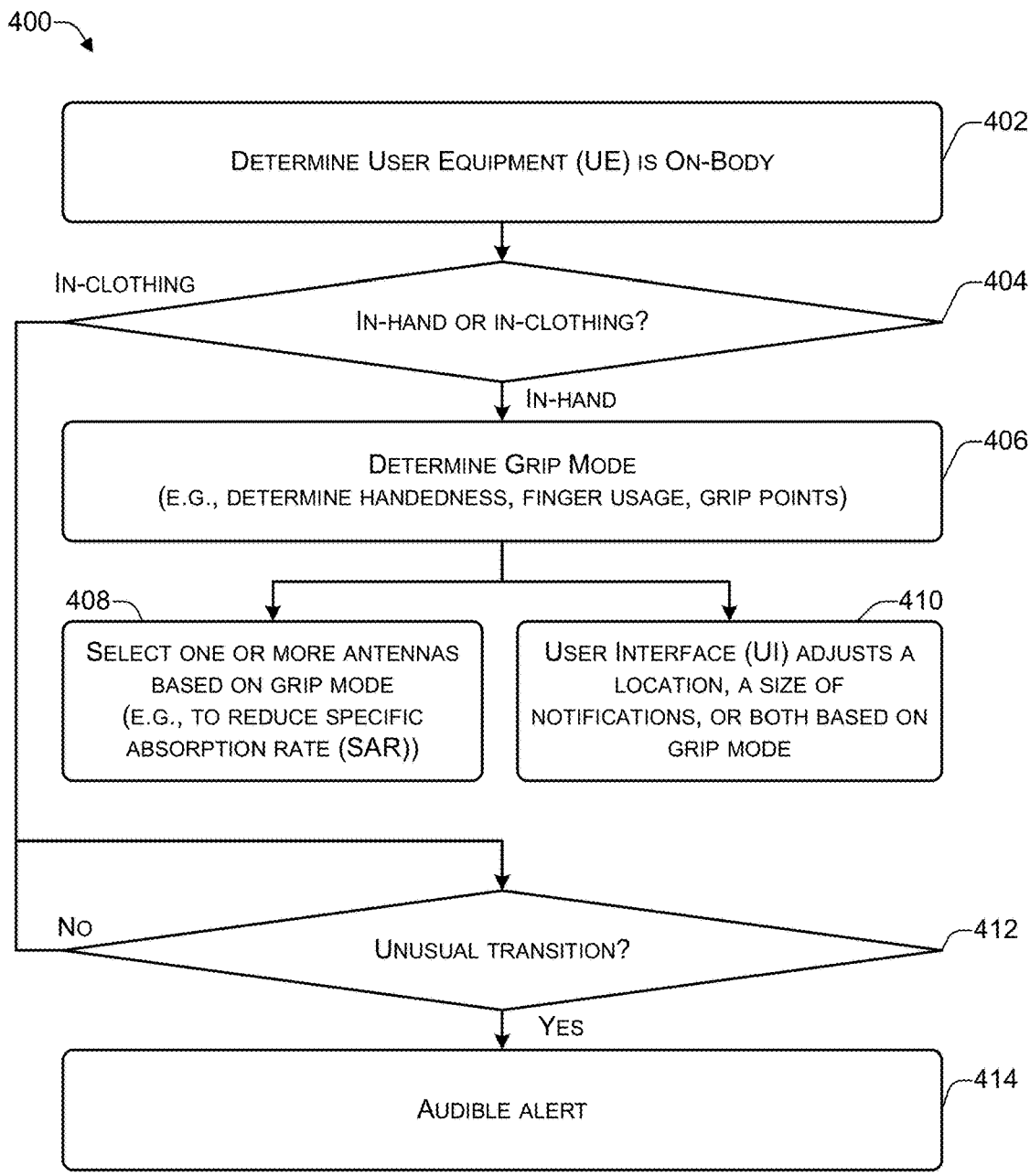
FIG. 4 illustrates an example process that includes determining an orientation of a user equipment (UE) is on-body, according to aspects of the disclosure.

FIG. 4 illustrates an example process 400 that includes determining an orientation of a user equipment (UE) is on-body, according to aspects of the disclosure. The process 400 may be performed by the user equipment 102 of FIGS. 1 and 2.

At 402, the process 400 determines that the user equipment is on-body. At 404, the process 400 determines whether the user equipment is located in-hand or in-clothing. If the process 400 determines, at 404, that the user equipment is in-hand, then the process 400 determines a grip mode, at 406. For example, in FIG. 1, based on determining that the position 152 is the on-body 154, the user equipment 102 may determine, based on touch data received by the touch sensor 136, whether the position 152 comprises the in-hand 158. Based on determining that the position 152 is the in-hand 158, the user equipment 102 may determine based at least in part on the touch data (from the touch sensor 136), the grip 162 (e.g., including the grip points 206) of FIG. 2). After 406, the process 400 may proceed to 408, 410, or both (e.g., substantially at the same time).

At 408, the process 400 selects one or more antennas based on the grip mode. For example, in FIG. 1, the user equipment 102 may disable one or more of the antennas 168 that are proximal to grip points (e.g., the grip points 206 of FIG. 2A, 2B) associated with the grip 162 (see also Table 1) and enable (e.g., select for use) one or more of the antennas 168 to reduce a specific absorption rate (SAR) and to increase antenna efficiency.

At 410, the process 400 instructs a user interface (UI) to adjust a location, a size of notifications, or both, based on the grip mode. For example, in FIG. 2, the user interface 124 may use the grip points 206 to move pop-up notifications, such as the pop-up 208, to a different location on the display device 116 to reduce the possibility of the grip points 206 obscuring the pop-up 208. To illustrate, the user interface 124 may move the pop-up 208 to a location in-between the grip points 206(3), 206(4), as illustrated in FIG. 2B. The user interface 124 may modify a size of the pop-up 208, a shape of the pop-up 208, a font size used by text in the pop-up 208, or any combination thereof.

If the process 400 determines, at 404, that the user equipment is in-clothing, then the process 400 determines whether an unusual transition occurred at 412. If the process 400 determines, at 412, that "yes" the unusual transition occurred, then the process causes the user equipment to emit an audible alert. If the process 400 determines, at 412, that know the unusual transition did not occur, then the process continues to monitor the position of the user equipment. For example, in FIG. 1, if the user equipment 102 determines the position 152 transitioned from the on-body 154 to the off-body 156 without an intervening in-hand 158, the user equipment 102 may generate an audible alert 414 using the speaker 122. The unusual transition may indicate, for example, that the user equipment 102 fell out of the user's clothing without the user being aware that the user equipment 102 is off-body.

Thus, the technical advantages of determining the grip mode may include selecting antennas based on the grip mode to reduce SAR and increase an efficiency of the selected antennas, make pop-up notifications visible to the user by positioning the notifications in an area of the display device that is not obscured by grip points, and alerting the user when the user equipment makes an unusual transition that indicates the user is unaware that the user equipment transitioned to off-body.

Figure 5:
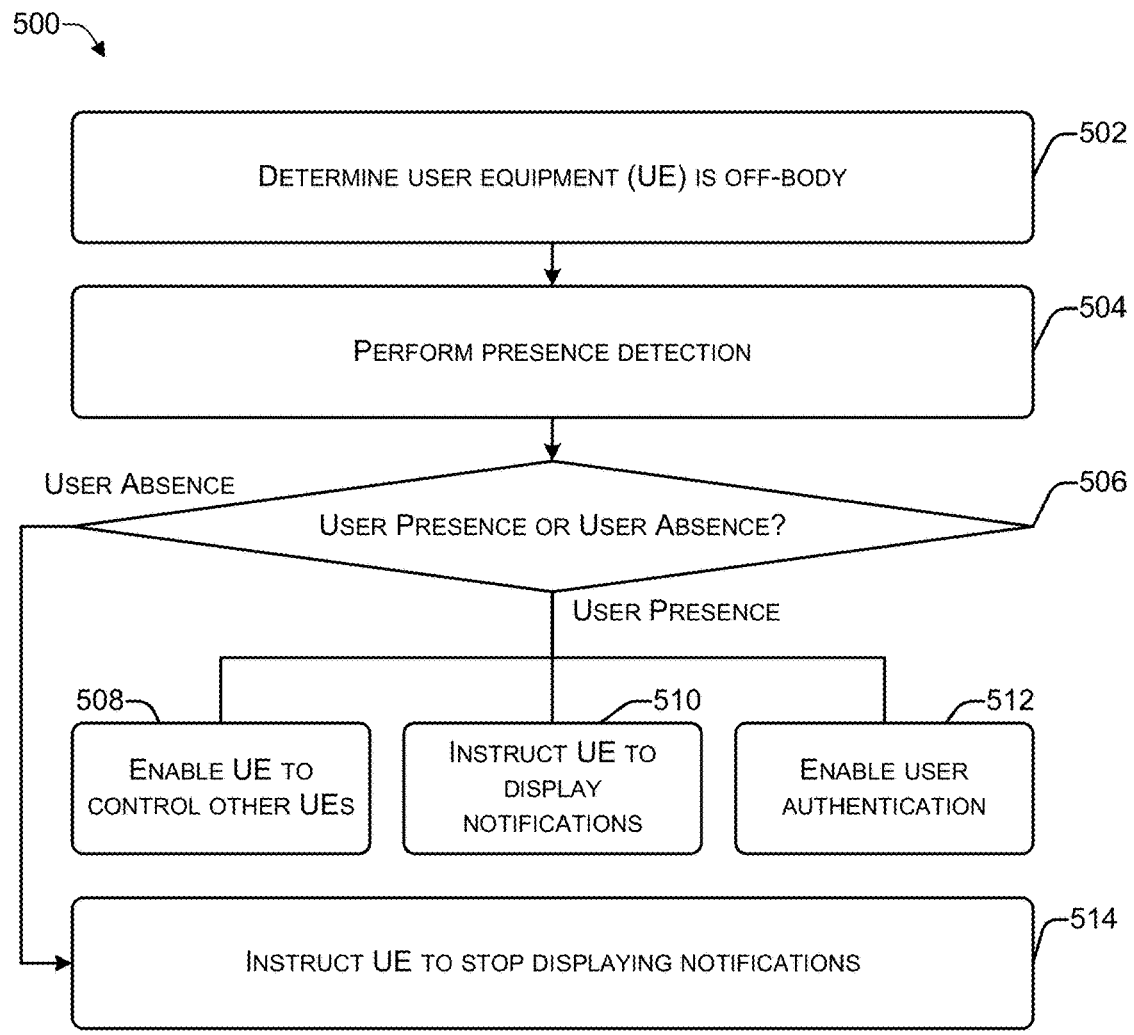
FIG. 5 illustrates an example process that includes determining an orientation of a user equipment (UE) is off-body, according to aspects of the disclosure.

FIG. 5 illustrates an example process 500 that includes determining an orientation of a user equipment (UE) is off-body, according to aspects of the disclosure. The process 500 may be performed by the user equipment 102 of FIGS. 1 and 2.

At 502, the process 500 determines that the user equipment is off-body. At 504, the process 500 performs presence detection. At 506, the process 500 determines whether the presence detection determined user presence or user absence. If the process 500 determines, at 506, the user presence, then the process 500 may perform 508, 510, 512, or any combination thereof, substantially at the same time. At 508, the process 500 enables the user equipment to control other user equipment, at 508. For example, in FIGS. 1, 2, and 3, after determining the off-body 156 and determining the user presence 316, the user equipment 102 may enable the user 108 to control other UEs (e.g., exercise machine, smart television, voice-assistant enabled device, or the like) using the user equipment 102. For example, the user equipment 102 may communicate with nearby devices, e.g., using Wi-Fi, Bluetooth, or another near field communication technology, to determine or share user presence or user absence information. For example, the user may be working out, near the user equipment 102, using exercise equipment that is Wi-Fi enabled, Bluetooth enabled, or the like. The user equipment 102 may communicate with the exercise equipment to determine the user presence. In addition, the user equipment 102 may communicate user presence or user absence to suitably enabled devices within a proximity of the user equipment 102. For example, if the user equipment 102 transitions from on-body, to in-hand, to off-body, then the user equipment 102 may alert suitably enabled devices within a proximity of the user equipment 102 of the user presence. In response, one or more of the suitably enabled devices may transition to a powered-on mode. For example, if the user 108 places the user equipment 102 on a surface and walks towards exercise equipment, the user equipment 102 may notify the exercise equipment of the user presence and the exercise equipment may automatically power on and automatically select a preferred workout associated with the user 108. As another example, if the user 108 walks towards an entertainment device (e.g., music playback/streaming device, television, or the like), the user equipment 102 may notify the entertainment device of the user presence and the entertainment device may automatically power on and automatically (e.g., without human interaction) select a preferred playlist, artist, album, channel, station, or the like.

At 510, the process 500 instructs the user equipment to display notifications on the display device. At 512, the process 500 enables user authentication (e.g., via facial recognition, voice recognition, or the like). After determining that the position 152 comprises the off-body 156, the user equipment 102 may communicate the user presence 416 or the user absence 422 with other devices, such as other devices that are incapable of determining the user presence 416 and the user absence 422. In some cases, after determining that the position comprises the off-body 156 and after determining the user presence 416, the user equipment 102 may select the camera 130 and enable a user authentication process 426 that is based on facial recognition. In other cases, after determining that the position comprises the off-body 156 and after determining the user presence 416, the user equipment 102 may select the microphone 128 and initiate the user authentication process 426 that is based on voice recognition. Based on determining that the position 152 comprises the off-body 156 and based on determining the user presence 416, the user equipment 102 may enable notifications to be displayed on the display device 116.

If the process 500 determines, at 506, the user absence, then the process may instruct the user equipment to stop displaying notifications, at 514. For example, in FIG. 1, after determining that the position 152 comprises the off-body 156 and after determining the user absence 422, the user equipment 102 may disable displaying notifications 424 on the display device 116 (e.g., to conserve battery power).

Thus, the technical advantages of determining the user presence include enabling a user equipment to control other proximal user equipment and automatically enabling the user equipment to authenticate the user, e.g., using facial recognition or the like. A technical advantage of determining the user absence includes conserving battery power by instructing the user equipment to stop displaying notifications on a display device.

Figure 6:
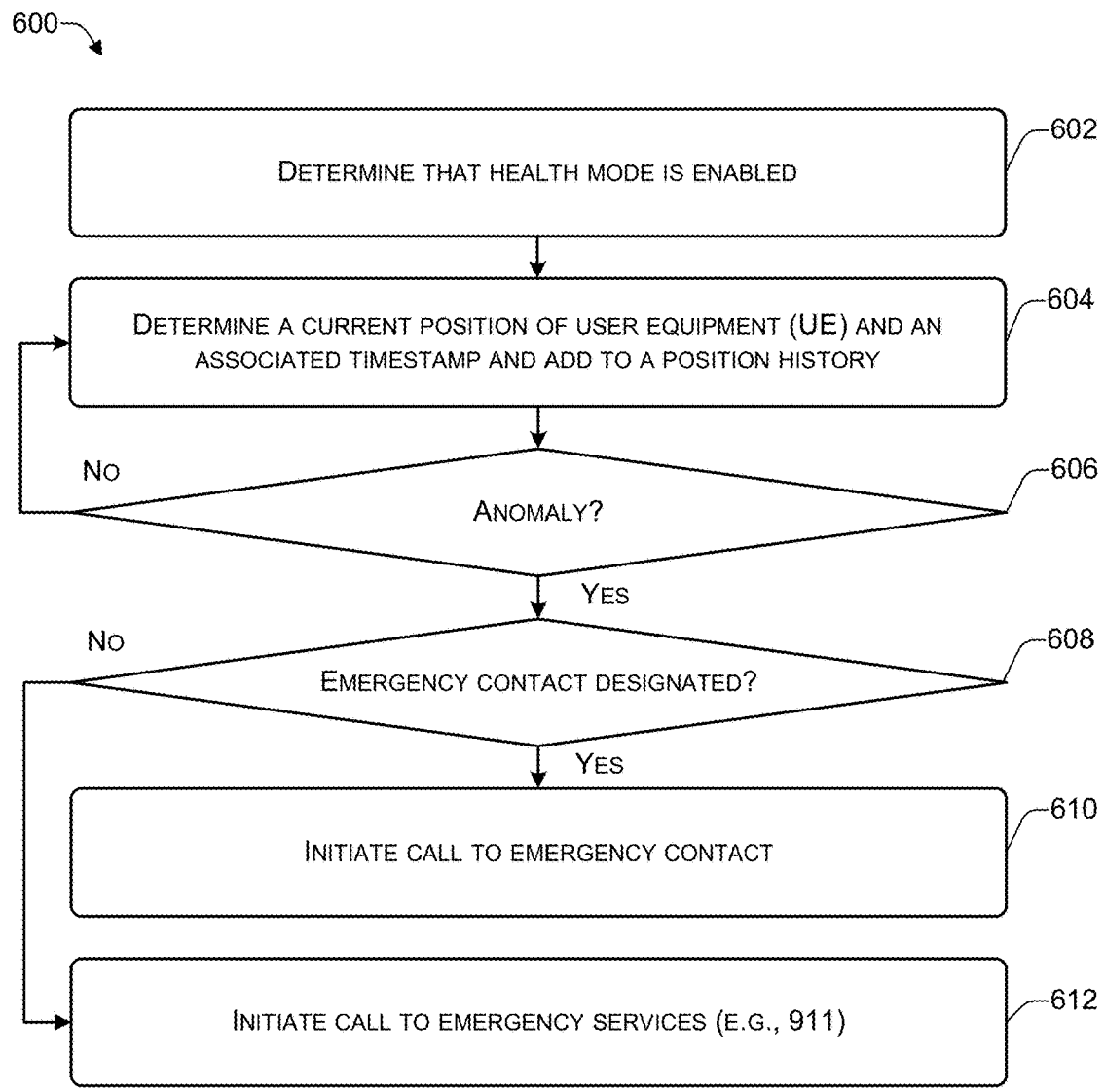
FIG. 6 illustrates an example process that includes determining a current position of a user equipment (UE), according to aspects of the disclosure.

FIG. 6 illustrates an example process 600 that includes determining a current position of a user equipment (UE), according to aspects of the disclosure. The process 600 may be performed by the user equipment 102 of FIGS. 1 and 2.

At 602, the process 600 determines that a health mode is enabled. At 604, the process 600 determines a current position of a user equipment and adds the current position, along with a timestamp indicating when the current position was determined, to a position history. For example, in FIGS. 1, 2, and 3, after the user equipment 102 determines that the health alert mode 174 is enabled, the user equipment 102 determines the current position 404(1) and an associated time 406(1) associated with the current position 404(1) and stores the current position 404(1) and the associated time 406(1) in the history 146. The position 404 and associated time 406 may be determined every X seconds (X>0, e.g., X=60). The history 146 may include N entries (N>0).

At 606, the process 600 determines (e.g., based on the position history) whether the current position is an anomaly. If the process 600 determines, at 606, that the process is not an anomaly, then the process 600 proceeds back to 604, where the current position is determined.

If the process determines, at 606, that the process 600 is an anomaly, then the process 60 proceeds to 608. At 608, the process 600 determines, at 608, whether the user has designated an emergency contact in the user equipment. If the process 600 determines, at 608, that "yes", the user has designated an emergency contact in the user equipment, then the process 600 initiates a call to the emergency contact, at 610. If the process 600 determines, at 608, that "no", the user has not designated an emergency contact, then the process 600 initiates a call to emergency services (e.g., 911 in North America), at 612. For example, in FIG. 1, if a length of time between the time associated with the current position and a time associated with a previous position satisfies a time threshold, indicating that the user 108 has not changed position relative to the user equipment 102 for at least a threshold amount of time, the user equipment 102 may automatically generate a notification 408 to a designated emergency contact or to emergency services.

A technical advantage of determining that health mode is enabled includes automatically determining whether the user has stayed in a particular position for more than a threshold amount of time and automatically initiating a call to an emergency contact or to emergency services. For example, if a user with medical issues enables health mode and the user experiences an issue such that the user cannot access the user equipment to call for help, the user equipment automatically initiates a call to an emergency contact or to emergency services.

Figure 7:
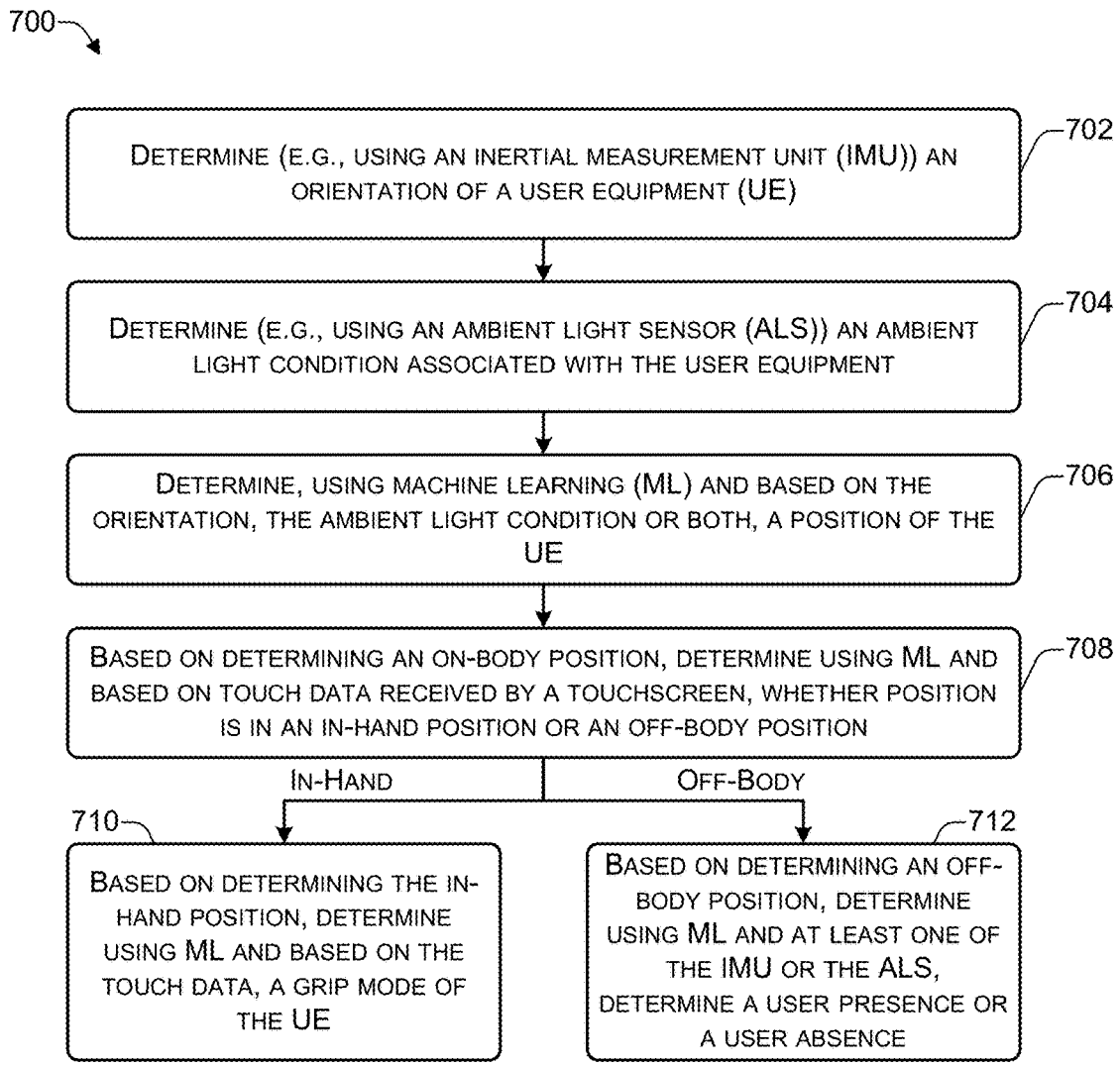
FIG. 7 illustrates an example process that includes determining an orientation of a user equipment (UE), according to aspects of the disclosure.

FIG. 7 illustrates an example process 700 that includes determining an orientation of a user equipment (UE), according to aspects of the disclosure. The process 700 may be performed by the user equipment 102 of FIGS. 1 and 2.

At 702, the process may determine, using an inertial measurement unit (IMU), an orientation of a user equipment. For example, in FIG. 1, the process may determine, using sensor data 120 received from the inertial measurement unit 126, an orientation (e.g., orientation 202(P) or orientation 202(L) of FIG. 2) of the user equipment 102.

At 704, the process may determine, using an ambient light sensor (ALS), an ambient light condition associated with the user equipment. For example, in FIG. 1, the process may determine, using sensor data 120 received from the ambient light sensor 134, and ambient light condition associated with the user equipment 102.

At 706, the process may determine, using machine learning (ML) and based on the orientation, the ambient light condition or both, a position of the user equipment. For example, in FIG. 1, the process may determine, based on the sensor data 120, the position 152 associated with the user equipment 102. The position 152 may be one of on-body 154, off-body 156, or in-hand 158.

At 708, the process may, based on determining the on-body position, determine using machine learning and based on touch data received by a touch screen, whether the position is an in-hand position. For example, in FIG. 1, if the process determines, based on the sensor data 120, that the position 152 is on-body 154, then the process may determine, based on the sensor data 120, whether the position 152 is in-hand 158. For example, if the sensor data 120 includes touch data received by the touch sensor 136 (e.g., that is associated with the touchscreen of the display device 116), then the process may determine that the position 152 is in-hand 158.

At 710, the process may, based on determining the in-hand position, determine using machine learning and based on the touch data, a grip mode of the user equipment. For example, in FIG. 1, after determining, based on the sensor data 120, that the position 152 is in-hand 158, the process may determine a type of the grip 162 (e.g., one of the grip types of Table 1) based on the grip points 206 of FIGS. 2A and 2B.

At 712, the process may, based on determining an off-body position, determine using machine learning and at least one of the inertial measurement unit or the ambient light sensor a user presence or a user absence. if the user equipment 102 is off-body 156, then the user equipment 102 may use one or more of the sensors 118 to determine whether the user 108 is nearby. If the user equipment 102 has been placed on a hard surface (e.g., a table), then the user equipment 102 may gather sensor data 120 from the accelerometer 140, the microphone 128 or the like, filter the sensor data 120 (e.g., to create filtered data), and use machine learning 148 to determine whether the filtered sensor data indicates the presence of the user 108. For example, when the user 108 is walking near the user equipment 102, the user 108 may create vibrations that are captured by the accelerometer 140, the microphone 128, or both. The filter 150 may be used to filter out ambient noise, leaving the vibrations caused by the user 108 in the filtered data. If the user equipment 102 has been placed on a soft surface (e.g., a bed, a sofa, or the like), then the user equipment 102 may analyze (e.g., using machine learning) ambient light data (e.g., the sensor data 120) received from the ambient light sensor 134 to determine user presence or user absence. For example, if the user 108 is walking near the user equipment 102, then the user equipment 102 may detect changes in the ambient light (e.g., caused by the user's body creating a shadow). The machine learning 148 may predict the user presence based on the changes in the ambient light data provided by the ambient light sensor 134.

Thus, the technical advantages of determining the grip mode may include selecting antennas based on the grip mode to reduce SAR and increase an efficiency of the selected antennas, make pop-up notifications visible to the user by positioning the notifications in an area of the display device that is not obscured by grip points, and alerting the user when the user equipment makes an unusual transition that indicates the user is unaware that the user equipment transitioned to off-body. The technical advantages of determining the user presence include enabling a user equipment to control other proximal user equipment and automatically enabling the user equipment to authenticate the user, e.g., using facial recognition or the like. A technical advantage of determining the user absence includes conserving battery power by instructing the user equipment to stop displaying notifications on a display device. A technical advantage of the health mode includes automatically determining whether the user has stayed in a particular position for more than a threshold amount of time and automatically initiating a call to an emergency contact or to emergency services. For example, if a user with medical issues enables health mode and the user experiences an issue such that the user cannot access the user equipment to call for help, the user equipment automatically initiates a call to an emergency contact or to emergency services.

Figure 8:
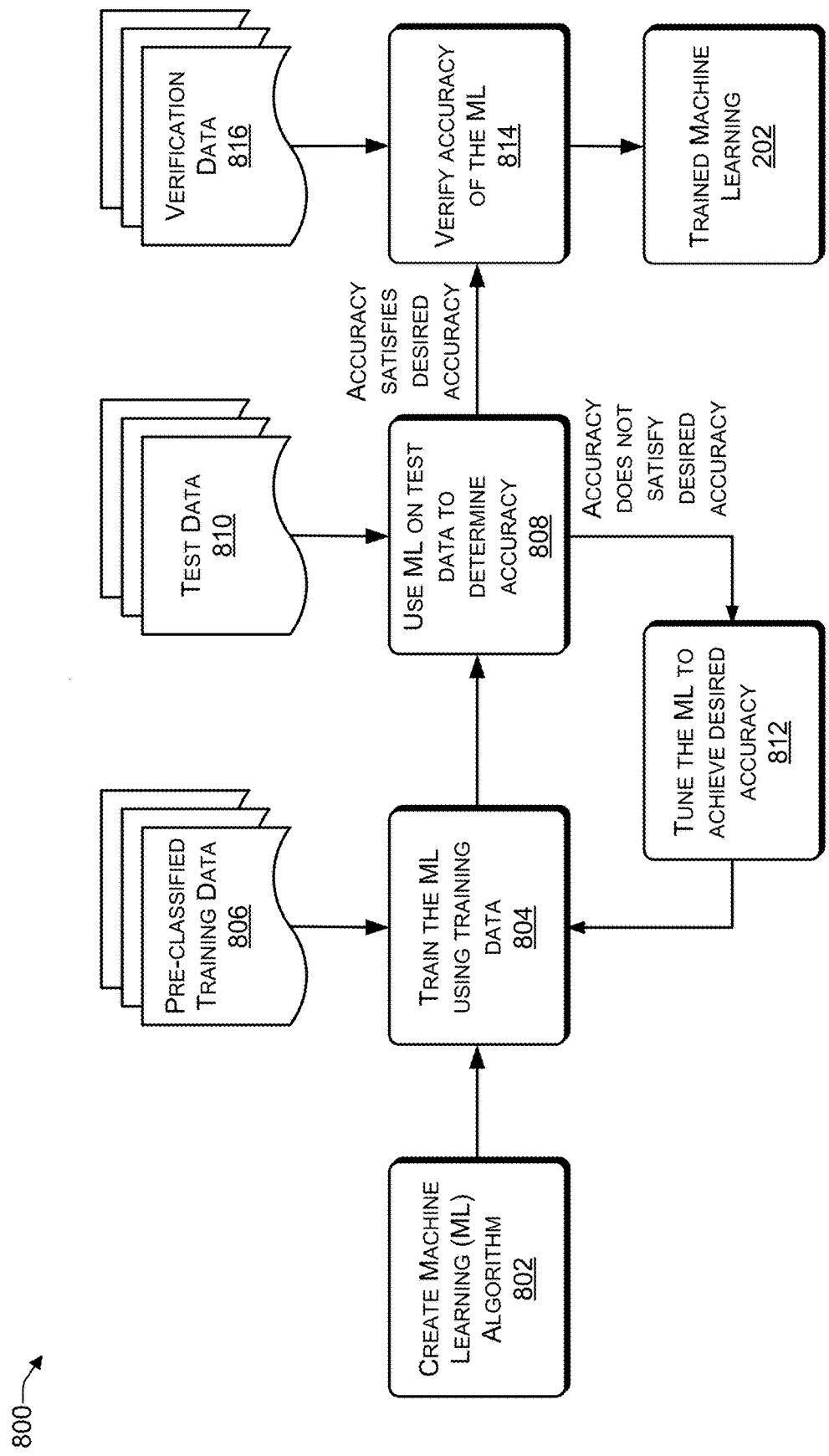
FIG. 8 illustrates an example of system to train a machine learning algorithm, according to various aspects of the disclosure.

FIG. 8 illustrates an example of system 800 to train a machine learning algorithm, such as a classifier, according to various aspects of the disclosure. The system 800 may be used by a manufacturer of the user equipment 102 prior to making the user equipment 102 available for acquisition (e.g., purchase or lease).

At 802, the machine learning algorithm (e.g., software code) may be created by one or more software designers. At 804, the machine learning algorithm may be trained using pre-classified training data 806. For example, the training data 806 may be collected based on known user behavior labeled accordingly. After the machine learning has been trained using the pre-classified training data 806, the machine learning may be tested, at 808, using test data 810 to determine an accuracy of the machine learning. For example, the accuracy of the classification may be determined using the test data 810.

If an accuracy of the machine learning does not satisfy a desired accuracy, at 808, then the machine learning code may be tuned, at 812, to achieve the desired accuracy. For example, at 812, the software designers may modify the machine learning software code to improve the accuracy of the machine learning algorithm. After the machine learning has been tuned, at 812, the machine learning may be retrained, at 804, using the pre-classified training data 806. In this way, 804, 808, 812 may be repeated until the machine learning is able to classify the test data 810 with the desired accuracy. For example, the machine learning 148 of FIG. 1 may be trained to predict (e.g., with a relatively high degree of accuracy), based on the sensor data 120 whether the user equipment 102 of FIG. 1 is on-body, off-body, in-hand, in-clothing, or the like.

After determining, at 808, that an accuracy of the machine learning satisfies the desired accuracy, the process may proceed to 814, where verification data 816 may be used to verify an accuracy of the machine learning. After the accuracy of the machine learning is verified, at 814, the trained machine learning 802, which has been trained to provide a particular level of accuracy, may be used in the user equipment 102. The pre-classified training data 806, the test data 810, and the verification data 816 may include the sensor data 120. In this way, the machine learning 148 uses the sensor data 120 to predict whether the user equipment 102 of FIG. 1 is on-body, off-body, in-hand, in-clothing, user presence, user absence, or the like, as described herein.

Figure 9A:
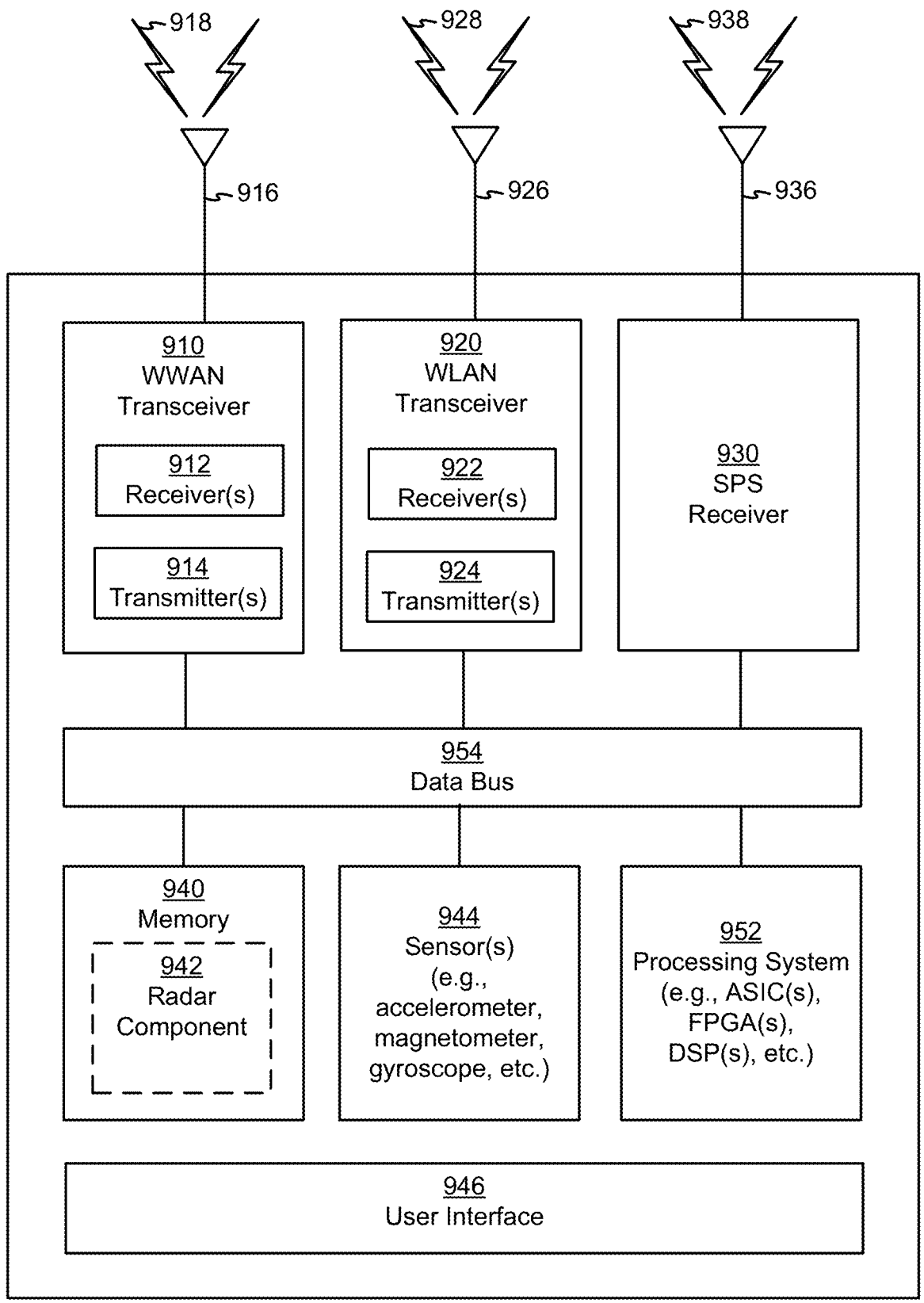
FIG. 9A and FIG. 9B are simplified block diagrams of several sample aspects of components that may be employed in wireless communication nodes and configured to support communication as described herein.
Figure 9B:
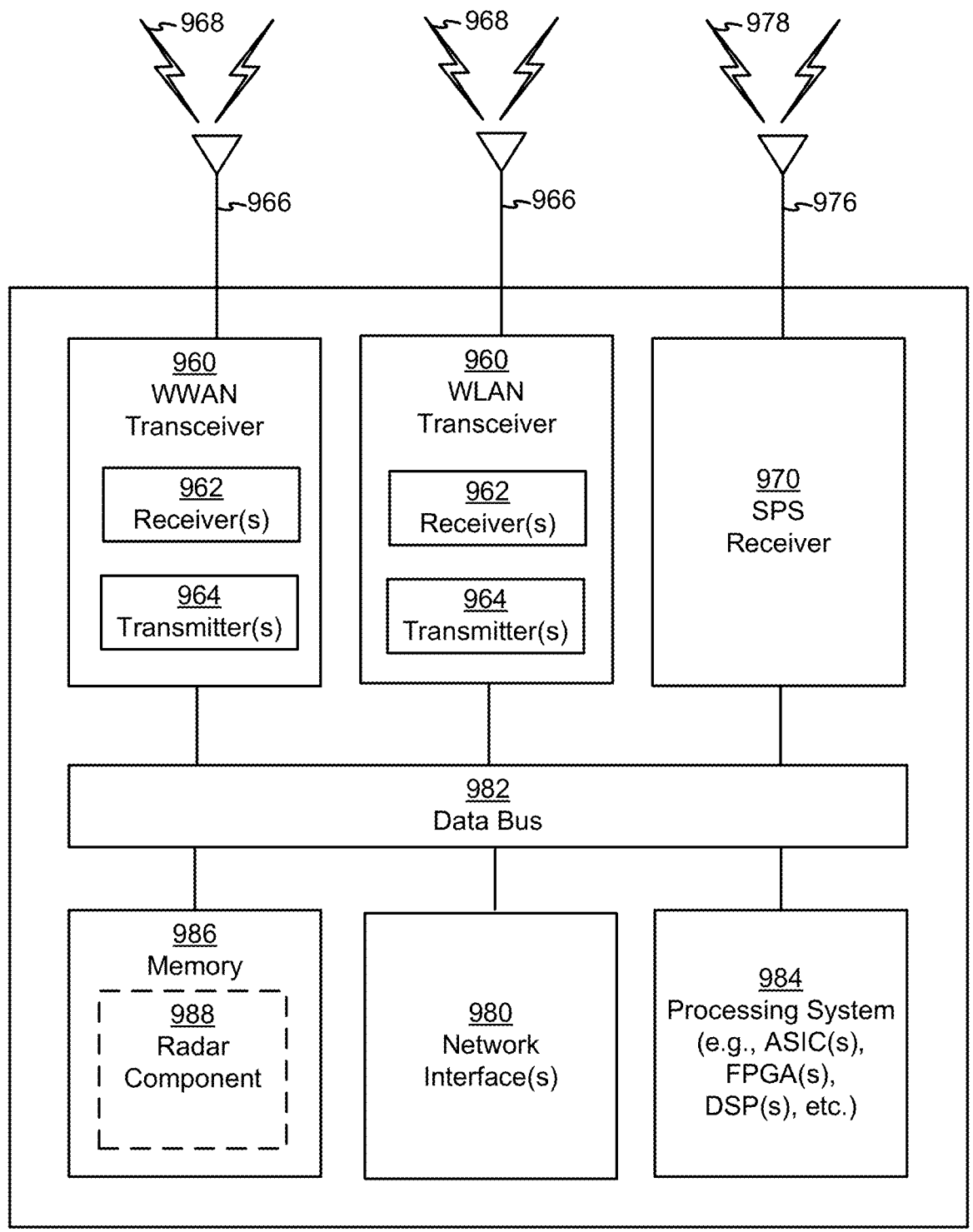

Referring to FIGS. 9A and 9B, several example components (represented by corresponding blocks) that may be incorporated into a UE (e.g., the user equipment 102 of FIG. 1), a base station (which may correspond to any of the base stations described herein), and a network entity (which may correspond to or embody any of the network functions described herein) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE, base station, or network entity may include wireless wide area network (WWAN) transceiver 910 and 950, respectively, configured to communicate via one or more wireless communication networks (not shown), such as an NR network, an LTE network, a GSM network, and/or the like. The WWAN transceivers 910 and 950 may be connected to one or more antennas 916 and 956, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 910 and 950 may be variously configured for transmitting and encoding signals 918 and 958 (e.g., messages, indications, information, and so on), respectively, and, conversely, for receiving and decoding signals 918 and 958 (e.g., messages, indications, information, pilots, and so on), respectively, in accordance with the designated RAT. Specifically, the transceivers 910 and 950 include one or more transmitters 914 and 954, respectively, for transmitting and encoding signals 918 and 958, respectively, and one or more receivers 912 and 952, respectively, for receiving and decoding signals 918 and 958, respectively.

The UE and the base station also include, at least in some cases, wireless local area network (WLAN) transceivers 920 and 960, respectively. The WLAN transceivers 920 and 960 may be connected to one or more antennas 926 and 966, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 920 and 960 may be variously configured for transmitting and encoding signals 928 and 968 (e.g., messages, indications, information, and so on), respectively, and, conversely, for receiving and decoding signals 928 and 968 (e.g., messages, indications, information, pilots, and so on), respectively, in accordance with the designated RAT. Specifically, the transceivers 920 and 960 include one or more transmitters 924 and 964, respectively, for transmitting and encoding signals 928 and 968, respectively, and one or more receivers 922 and 962, respectively, for receiving and decoding signals 928 and 968, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 916, 926, 956, 966), such as an antenna array, that permits the respective apparatus to perform transmit "beamforming," as described herein. Similarly, a receiver may include or be coupled to a plurality of antennas (e.g., antennas 916, 926, 956, 966), such as an antenna array, that permits the respective apparatus to perform receive beamforming, as described herein. In an aspect, the transmitter and receiver may share the same plurality of antennas (e.g., antennas 916, 926, 956, 966), such that the respective apparatus can only receive or transmit at a given time, not both at the same time. A wireless communication device (e.g., one or both of the transceivers 910 and 920 and/or 950 and 960) of the UE and/or the base station may also comprise a network listen module (NLM) or the like for performing various measurements.

The UE and the base station may include, at least in some cases, satellite positioning systems (SPS) receivers 930 and 970. The SPS receivers 930 and 970 may be connected to one or more antennas 936 and 976, respectively, for receiving SPS signals 938 and 978, respectively, such as Global Positioning System (GPS) signals, GLObal NAvigation Satellite System (GLONASS) signals, Galileo signals, Beidou signals, Indian Regional Navigation Satellite System (NAVIC), Quasi-Zenith Satellite System (QZSS), etc. The SPS receivers 930 and 970 may comprise any suitable hardware and/or software for receiving and processing SPS signals 938 and 978, respectively. The SPS receivers 930 and 970 request information and operations as appropriate from the other systems, and performs calculations necessary to determine positions of the UE and the base station using measurements obtained by any suitable SPS algorithm.

The base station and the network entity may each include at least one network interface 980 for communicating with other network entities. For example, the network interfaces 980 (e.g., one or more network access ports) may be configured to communicate with one or more network entities via a wire-based or wireless backhaul connection. In some aspects, the network interfaces 980 may be implemented as transceivers configured to support wire-based or wireless signal communication. This communication may involve, for example, sending and receiving messages, parameters, and/or other types of information.

The UE, the base station, and the network entity may include other components that may be used in conjunction with the operations as disclosed herein. The UE may include processor circuitry implementing a processing system 932 for providing functionality relating to, for example, RF sensing, and for providing other processing functionality. The base station may include a processing system 984 for providing functionality relating to, for example, RF sensing as disclosed herein, and for providing other processing functionality. The network entity may include a processing system for providing functionality relating to, for example, Wi-Fi positioning or RF sensing as disclosed herein, and for providing other processing functionality. In an aspect, the processing systems 932, 984 may include, for example, one or more general purpose processors, multi-core processors, ASICs, digital signal processors (DSPs), field programmable gate arrays (FPGA), or other programmable logic devices or processing circuitry.

The UE, the base station, and the network entity may include memory circuitry implementing memory components 940, 986 (e.g., each including a memory device, such as the memory 114 of FIG. 1), respectively, for maintaining information (e.g., information indicative of reserved resources, thresholds, parameters, and so on). In some cases, the UE, the base station, and the network entity may include positioning components 942, 988, respectively. The positioning components 942, 988 may be hardware circuits that are part of or coupled to the processing systems 932, 984 respectively, that, when executed, cause the UE, the base station, and the network entity to perform the functionality described herein. In other aspects, the positioning components 942, 988 may be external to the processing systems 932, 984 (e.g., part of a modem processing system, integrated with another processing system, etc.). Alternatively, the positioning components 942, 988 may be memory modules (as shown in FIGS. 9A, 9B) stored in the memory components 940, 986 respectively, that, when executed by the processing systems 932, 984 (or a modem processing system, another processing system, etc.), cause the UE, the base station, and the network entity to perform the functionality described herein.

The UE may include one or more sensors 944 (e.g., the sensors 118 of FIG. 1) coupled to the processing system 932 to provide movement and/or orientation information that is independent of motion data derived from signals received by the WWAN transceiver 910, the WLAN transceiver 920, and/or the SPS receiver 930. By way of example, the sensor(s) 944 may include an accelerometer (e.g., a microelectrical mechanical system (MEMS) device), a gyroscope, a geomagnetic sensor (e.g., a compass), an altimeter (e.g., a barometric pressure altimeter), and/or any other type of movement detection sensor. Moreover, the sensor(s) 944 may include a plurality of different types of devices and combine their outputs in order to provide motion information. For example, the sensor(s) 944 may use a combination of a multi-axis accelerometer and orientation sensors to provide the ability to compute positions in 2D and/or 3D coordinate systems.

In addition, the UE may include a user interface 946 for providing indications (e.g., audible and/or visual indications) to a user and/or for receiving user input (e.g., upon user actuation of a sensing device such a keypad, a touch screen, a microphone, and so on). Although not shown, the base station and the network entity may also include user interfaces.

Referring to the processing system 984 in more detail, in the downlink, IP packets from the network entity may be provided to the processing system 984. The processing system 984 may implement functionality for an RRC layer, a packet data convergence protocol (PDCP) layer, a radio link control (RLC) layer, and a medium access control (MAC) layer. The processing system 984 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 954 and the receiver 952 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 954 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE. Each spatial stream may then be provided to one or more different antennas 956. The transmitter 954 may modulate an RF carrier with a respective spatial stream for transmission.

At the UE, the receiver 912 receives a signal through its respective antenna(s) 916. The receiver 912 recovers information modulated onto an RF carrier and provides the information to the processing system 932. The transmitter 914 and the receiver 912 implement Layer-1 functionality associated with various signal processing functions. The receiver 912 may perform spatial processing on the information to recover any spatial streams destined for the UE. If multiple spatial streams are destined for the UE, they may be combined by the receiver 912 into a single OFDM symbol stream. The receiver 912 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station. These soft decisions may be based on channel estimates computed by a channel estimator. The soft decisions are then decoded and de-interleaved to recover the data and control signals that were originally transmitted by the base station on the physical channel. The data and control signals are then provided to the processing system 932, which implements Layer-3 and Layer-2 functionality.

In the uplink, the processing system 932 provides demultiplexing between transport and logical channels, packet reassembly, deciphering, header decompression, and control signal processing to recover IP packets from the core network. The processing system 932 is also responsible for error detection.

Similar to the functionality described in connection with the downlink transmission by the base station, the processing system 932 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station may be used by the transmitter 914 to select the appropriate coding and modulation schemes, and to facilitate spatial processing. The spatial streams generated by the transmitter 914 may be provided to different antenna(s) 916. The transmitter 914 may modulate an RF carrier with a respective spatial stream for transmission.

The uplink transmission is processed at the base station in a manner similar to that described in connection with the receiver function at the UE. The receiver 952 receives a signal through its respective antenna(s) 956. The receiver 952 recovers information modulated onto an RF carrier and provides the information to the processing system 984.

In the uplink, the processing system 984 provides demultiplexing between transport and logical channels, packet reassembly, deciphering, header decompression, control signal processing to recover IP packets from the UE. IP packets from the processing system 984 may be provided to the core network. The processing system 984 is also responsible for error detection.

For convenience, the UE, the base station, and/or the network entity are shown in FIGS. 9A, 9B as including various components that may be configured according to the various examples described herein. It will be appreciated, however, that the illustrated blocks may have different functionality in different designs.

The various components of the UE, the base station, and the network entity may communicate with each other over data buses 934, 982 respectively. The components of FIGS. 9A, 9B may be implemented in various ways. In some implementations, the components of FIGS. 9A, 9B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by 910 to 946 may be implemented by processor and memory component(s) of the UE (e.g., by execution of appropriate code and/or by appropriate configuration of processor components). Similarly, some or all of the functionality represented by 950 to 988 may be implemented by processor and memory component(s) of the base station (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 932, 984 the transceivers 910, 920, 950, and 960, the memory components 940, 986 the positioning components 942, 988 etc.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor (e.g., cache memory).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method to passively determine a position of a user equipment (UE), the method comprising: determining, using an inertial measurement unit of the user equipment, an orientation of the user equipment; determining, using an ambient light sensor of the user equipment, an ambient light condition associated with the user equipment; determining, using a machine learning module of the user equipment, based on the orientation and the ambient light condition, a position of the user equipment; based on determining that the position comprises an on-body position, determining using the machine learning module and based on touch data received by a touchscreen of the user equipment whether the position comprises an in-hand position; based on determining that the position comprises the in-hand position, determining, using the machine learning module and based at least in part on the orientation and the touch data, a grip mode associated with the user equipment; and based on determining that the position comprises an off-body position, determining a user presence or a user absence, using the machine learning module and at least one of the inertial measurement unit or the ambient light sensor.

Clause 2. The method of clause 1, wherein determining the user presence or the user absence, using the machine learning module and at least one of the inertial measurement unit or the ambient light sensor comprises: receiving vibration data from the inertial measurement unit; filtering the vibration data to create filtered vibration data; based on determining, using the machine learning module, that the filtered vibration data indicates user movement, determining the user presence; and based on determining, using the machine learning module, that the filtered vibration data indicates lack of user movement, determining the user absence.

Clause 3. The method of any of clauses 1 to 2, wherein determining the user presence or the user absence, using the machine learning module and at least one of the inertial measurement unit or the ambient light sensor comprises: receiving ambient light data from the ambient light sensor; based on determining, using the machine learning module, that the ambient light data indicates user movement, determining the user presence; and based on determining, using the machine learning module, that the ambient light data indicates lack of user movement, determining the user absence.

Clause 4. The method of any of clauses 1 to 3, further comprising: based on determining that the position comprises the in-hand position, tuning one or more transmission antennas of the user equipment that are proximal to grip points associated with the grip mode.

Clause 5. The method of any of clauses 1 to 4, further comprising: based on determining that the position comprises the off-body position, communicating a user presence and a user absence to other devices, wherein the other devices are incapable of determining the user presence and the user absence.

Clause 6. The method of any of clauses 1 to 5, further comprising: based on determining that the position comprises the off-body position and based on determining the user absence, disabling notifications associated with the user equipment.

Clause 7. The method of clause 6, further comprising: based on determining that the position comprises the off-body position and based on determining the user presence, enabling notifications associated with the user equipment.

Clause 8. The method of any of clauses 1 to 7, further comprising: based on determining that the position comprises the on-body position and based on determining the grip mode, arranging graphical components of a user interface (UI) of the user equipment based on grip points of the grip mode.

Clause 9. The method of any of clauses 1 to 8, further comprising: based on determining that the position comprises the off-body position and based on determining the user presence, selecting a camera sensor of the user equipment and initiating a user authentication process that is based on facial recognition.

Clause 10. The method of any of clauses 1 to 9, further comprising: based on determining that the position comprises the off-body position and based on determining the user presence, selecting a microphone of the user equipment and initiating a user authentication process that is based on voice recognition.

Clause 11. The method of any of clauses 1 to 10, further comprising: based on determining that the position transitioned from the on-body position to the off-body position without determining an intervening in-hand position, generating an audible alert using a speaker of the user equipment.

Clause 12. The method of any of clauses 1 to 11, further comprising: based on determining that a health alert mode is enabled, determining a current position of the user equipment and a current time associated with the current position; storing the current position and the current time in a position history associated with the user equipment; and based on determining that a length of time between the current time associated with the current position and a previous time associated with a previous position satisfies a time threshold, automatically generating a notification.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method to passively determine a position of a user equipment (UE), the method comprising:
   determining, using an inertial measurement unit of the user equipment, an orientation of the user equipment;
   determining, using an ambient light sensor of the user equipment, an ambient light condition associated with the user equipment;
   determining, using a machine learning module of the user equipment, based on the orientation and the ambient light condition, a position of the user equipment;
   based on determining that the position comprises an on-body position, determining using the machine learning module and based on touch data received by a touchscreen of the user equipment whether the position comprises an in-hand position;
   based on determining that the position comprises the in-hand position, determining, using the machine learning module and based at least in part on the orientation and the touch data, a grip mode associated with the user equipment; and
   based on determining that the position comprises an off-body position, determining a user presence or a user absence, using the machine learning module and at least one of the inertial measurement unit or the ambient light sensor.

2. The method of claim 1, wherein determining the user presence or the user absence, using the machine learning module and at least one of the inertial measurement unit or the ambient light sensor comprises:
   receiving vibration data from the inertial measurement unit;
   filtering the vibration data to create filtered vibration data;
   based on determining, using the machine learning module, that the filtered vibration data indicates user movement, determining the user presence; and
   based on determining, using the machine learning module, that the filtered vibration data indicates lack of user movement, determining the user absence.

3. The method of claim 1, wherein determining the user presence or the user absence, using the machine learning module and at least one of the inertial measurement unit or the ambient light sensor comprises:
- receiving ambient light data from the ambient light sensor;
- based on determining, using the machine learning module, that the ambient light data indicates user movement, determining the user presence; and
- based on determining, using the machine learning module, that the ambient light data indicates lack of user movement, determining the user absence.

4. The method of claim 1, further comprising:
- based on determining that the position comprises the in-hand position, tuning one or more transmission antennas of the user equipment that are proximal to grip points associated with the grip mode.

5. The method of claim 1, further comprising:
- based on determining that the position comprises the off-body position, communicating a user presence and a user absence to other devices, wherein the other devices are incapable of determining the user presence and the user absence.

6. The method of claim 1, further comprising:
- based on determining that the position comprises the off-body position and based on determining the user absence, disabling notifications associated with the user equipment.

7. The method of claim 6, further comprising:
- based on determining that the position comprises the off-body position and based on determining the user presence, enabling notifications associated with the user equipment.

8. The method of claim 1, further comprising:
- based on determining that the position comprises the on-body position and based on determining the grip mode, arranging graphical components of a user interface (UI) of the user equipment based on grip points of the grip mode.

9. The method of claim 1, further comprising:
- based on determining that the position comprises the off-body position and based on determining the user presence, selecting a camera sensor of the user equipment and initiating a user authentication process that is based on facial recognition.

10. The method of claim 1, further comprising:
- based on determining that the position comprises the off-body position and based on determining the user presence, selecting a microphone of the user equipment and initiating a user authentication process that is based on voice recognition.

11. The method of claim 1, further comprising:
- based on determining that the position transitioned from the on-body position to the off-body position without determining an intervening in-hand position, generating an audible alert using a speaker of the user equipment.

12. The method of claim 1, further comprising:
- based on determining that a health alert mode is enabled, determining a current position of the user equipment and a current time associated with the current position;
- storing the current position and the current time in a position history associated with the user equipment; and
- based on determining that a length of time between the current time associated with the current position and a previous time associated with a previous position satisfies a time threshold, automatically generating a notification.

13. An apparatus, comprising:
- a memory;
- a communication interface; and
- at least one processor communicatively coupled to the memory and the communication interface, the at least one processor configured to:
  - determine an orientation of the apparatus using an inertial measurement unit of the apparatus;
  - determine an ambient light condition associated with the apparatus using an ambient light sensor of the apparatus;
  - determine a position of the apparatus using a machine learning module of the apparatus and based on the orientation and the ambient light condition;
  - based on determining that the position comprises an on-body position, determine whether the position comprises an in-hand position, using the machine learning module and based on touch data received by a touchscreen of the apparatus;
  - based on determining that the position comprises the in-hand position, determine a grip mode associated with the apparatus, using the machine learning module and based at least in part on the orientation and the touch data; and
  - based on determining that the position comprises an off-body position, determine a user presence or a user absence, using the machine learning module and at least one of the inertial measurement unit or the ambient light sensor.

14. The apparatus of claim 13, wherein the at least one processor configured to determine the user presence or the user absence, using the machine learning module and at least one of the inertial measurement unit or the ambient light sensor comprises the at least one processor configured to:
- receive, via the communication interface, vibration data from the inertial measurement unit;
- filter the vibration data to create filtered vibration data;
- determining the user presence based on determining, using the machine learning module, that the filtered vibration data indicates user movement; and
- determining the user absence based on determining, using the machine learning module, that the filtered vibration data indicates lack of user movement.

15. The apparatus of claim 13, wherein the at least one processor configured to determine the user presence or the user absence, using the machine learning module and at least one of the inertial measurement unit or the ambient light sensor, comprises the at least one processor configured to:
- receive, via the communication interface, ambient light data from the ambient light sensor;
- determining the user presence, based on determining, using the machine learning module, that the ambient light data indicates user movement; and
- determine the user absence, based on determining, using the machine learning module, that the ambient light data indicates lack of user movement.

16. The apparatus of claim 13, wherein the at least one processor is further configured to:
- determine one or more transmission antennas of the apparatus that are proximal to grip points associated with the grip mode based on determining that the position comprises the in-hand position.

17. The apparatus of claim 13, wherein the at least one processor is further configured to:
- communicate a user presence and a user absence to other devices based on determining that the position comprises the off-body position, wherein the other devices are incapable of determining the user presence and the user absence.

18. The apparatus of claim 13, wherein the at least one processor is further configured to:
disable notifications associated with the apparatus based on determining that the position comprises the off-body position and based on determining the user absence.

19. The apparatus of claim 13, wherein the at least one processor is further configured to:
enable notifications associated with the apparatus based on determining that the position comprises the off-body position and based on determining the user presence.

20. The apparatus of claim 13, wherein the at least one processor is further configured to:
arrange graphical components of a user interface (UI) of the apparatus based on grip points of the grip mode, based on determining that the position comprises the on-body position and based on determining the grip mode.

21. The apparatus of claim 13, wherein the at least one processor is further configured to:
automatically select a camera sensor of the apparatus and initiate a user authentication process that is based on facial recognition, based on determining that the position comprises the off-body position and based on determining the user presence.

22. The apparatus of claim 13, wherein the at least one processor is further configured to:
select a microphone of the apparatus and initiate a user authentication process that is based on voice recognition, based on determining that the position comprises the off-body position and based on determining the user presence.

23. The apparatus of claim 13, wherein the at least one processor is further configured to:
generate an audible alert using a speaker of the apparatus, based on determining that the position transitioned from the on-body position to the off-body position without determining an intervening in-hand position.

24. The apparatus of claim 13, wherein the at least one processor is further configured to:
determine a current position of the apparatus and a current time associated with the current position, based on determining that a health alert mode is enabled;
store the current position and the current time in a position history associated with the apparatus; and
automatically generate a notification, based on determining that a length of time between the current time associated with the current position and a previous time associated with a previous position satisfies a time threshold.

25. A user equipment, comprising:
means for determining an orientation of the user equipment;
means for determining an ambient light condition associated with the user equipment;
means for determining a position of the user equipment, using a machine learning module of the user equipment and based on the orientation and the ambient light condition;
means for determining whether the position comprises an in-hand position using the machine learning module and based on touch data received by a touchscreen of the user equipment;
means for determining a grip mode associated with the user equipment, using the machine learning module and based at least in part on the orientation and the touch data; and
means for determining a user presence or a user absence, using the machine learning module and at least one of the means for determining the orientation of the user equipment and the means for determining the ambient light condition associated with the user equipment.

26. The user equipment of claim 25, wherein the means for determining the user presence or the user absence comprises:
means for receiving vibration data;
means for filtering the vibration data to create filtered vibration data;
means for determining that the filtered vibration data indicates user movement;
means for determining the user presence using the machine learning module; and
means for using the machine learning module to determine the user absence, based on determining that the filtered vibration data indicates lack of user movement.

27. The user equipment of claim 25, wherein the means for determining the user presence or the user absence comprises:
means for receiving ambient light data from an ambient light sensor;
means for using the machine learning module to determine the user presence based on determining that the ambient light data indicates user movement; and
means for using the machine learning module to determine the user absence based on determining that the ambient light data indicates lack of user movement.

28. A non-transitory computer-readable medium storing computer-executable instructions that, when executed by a user equipment, cause the user equipment to:
determine, using an inertial measurement unit of the user equipment, an orientation of the user equipment;
determine, using an ambient light sensor of the user equipment, an ambient light condition associated with the user equipment;
determine, using a machine learning module of the user equipment, based on the orientation and the ambient light condition, a position of the user equipment;
determine, using the machine learning module and based on touch data received by a touchscreen of the user equipment, whether the position comprises an in-hand position;
determine, using the machine learning module and based at least in part on the orientation and the touch data, a grip mode associated with the user equipment; and
determine a user presence or a user absence, using the machine learning module and at least one of the inertial measurement unit or the ambient light sensor.

29. The non-transitory computer-readable medium of claim 28, wherein the instructions, when further executed by the user equipment, cause the user equipment to:
receive vibration data from the inertial measurement unit;
filter the vibration data to create filtered vibration data;
use the machine learning module, that the filtered vibration data indicates user movement, determining the user presence; and
use the machine learning module, that the filtered vibration data indicates lack of user movement, determining the user absence.

30. The non-transitory computer-readable medium of claim 28, wherein the instructions, when further executed by the user equipment, cause the user equipment to:
receive ambient light data from the ambient light sensor;
determine the user presence based on determining, using the machine learning module, that the ambient light data indicates user movement; and
determine the user absence based on determining, using the machine learning module, that the ambient light data indicates lack of user movement.

* * * * *